US008917900B2

(12) United States Patent
Kanetani et al.

(10) Patent No.: US 8,917,900 B2
(45) Date of Patent: Dec. 23, 2014

(54) MEASUREMENT APPARATUS

(75) Inventors: Yoshihiro Kanetani, Fukuchiyama (JP); Takahiro Suga, Fukuchiyama (JP); Hiroaki Takimasa, Ayabe (JP); Naoya Nakashita, Ayabe (JP); Yusuke Iida, Ayabe (JP)

(73) Assignee: Omron Corporation, Kyoto (JP)

( * ) Notice: Subject to any disclaimer, the term of this patent is extended or adjusted under 35 U.S.C. 154(b) by 967 days.

(21) Appl. No.: 12/712,530

(22) Filed: Feb. 25, 2010

(65) Prior Publication Data

US 2010/0232650 A1 Sep. 16, 2010

(30) Foreign Application Priority Data

Mar. 13, 2009 (JP) ................... 2009-061978

(51) Int. Cl.
*G06K 9/00* (2006.01)
*G01B 11/06* (2006.01)
*G01B 11/14* (2006.01)
*G02B 7/38* (2006.01)

(52) U.S. Cl.
CPC ............ *G01B 11/0608* (2013.01); *G01B 11/14* (2013.01); *G02B 7/38* (2013.01)
USPC ............................ 382/100; 382/141; 382/145

(58) Field of Classification Search
None
See application file for complete search history.

(56) References Cited

U.S. PATENT DOCUMENTS

| 4,906,940 | A | * | 3/1990 | Greene et al. ................. 382/100 |
| 5,408,083 | A | * | 4/1995 | Hirukawa et al. .......... 250/201.2 |
| 6,107,637 | A | * | 8/2000 | Watanabe et al. ........... 250/559.3 |
| 6,344,930 | B1 | * | 2/2002 | Kaneko et al. ................. 359/666 |
| 6,347,150 | B1 | * | 2/2002 | Hiroi et al. ..................... 382/149 |
| 6,541,747 | B1 | * | 4/2003 | Kikuchi et al. ............. 250/201.2 |
| 6,717,142 | B2 | * | 4/2004 | Hiroi et al. ......................... 850/5 |
| 6,828,554 | B2 | * | 12/2004 | Hiroi et al. ....................... 850/10 |
| 6,907,133 | B2 | * | 6/2005 | Gotoh ........................... 382/106 |
| 6,947,582 | B1 | | 9/2005 | Vilsmeier et al. |
| 7,016,525 | B2 | * | 3/2006 | Gladnick ....................... 382/141 |
| 7,092,105 | B2 | * | 8/2006 | Lim et al. ....................... 356/601 |
| 7,175,945 | B2 | * | 2/2007 | Mieher et al. ..................... 430/5 |

(Continued)

FOREIGN PATENT DOCUMENTS

| DE | 19944516 A1 | 4/2001 |
| JP | 10-288508 A | 10/1998 |
| JP | 2005-337935 | 12/2005 |

OTHER PUBLICATIONS

German Patent and Trademark Office action on application No. 10 2010 000 467.7 dated Jun. 8, 2011; 5 pages.

*Primary Examiner* — Avinash J Yentrapati
(74) *Attorney, Agent, or Firm* — Foley & Lardner LLP

(57) ABSTRACT

In a measurement apparatus, higher-quality measurement is realized in measurement of measurement object displacement or imaging of a two-dimensional image. In a controller, a light receiving signal of a photodiode is supplied to a displacement measuring unit of a sensor head in order to measure a height of a measurement object, and the height of a surface of the measurement object is measured based on the light receiving signal. Then, in the controller, image obtaining timing is determined based on the height of the measurement object. Specifically, a focus adjustment value corresponding to the computed height of the measurement object is obtained from the table, and an image obtaining signal is transmitted to an imaging device at the timing the focus adjustment value is realized. Therefore, a length between two points on the measurement object is computed from the thus obtained image based on the height of the measurement object.

9 Claims, 28 Drawing Sheets

(56) References Cited

U.S. PATENT DOCUMENTS

| | | | |
|---|---|---|---|
| 7,310,431 B2* | 12/2007 | Gokturk et al. | 382/103 |
| 7,313,252 B2* | 12/2007 | Matei et al. | 382/100 |
| 7,651,826 B2* | 1/2010 | Takahara et al. | 430/30 |
| 7,692,144 B2* | 4/2010 | Watanabe et al. | 250/307 |
| 7,760,928 B2* | 7/2010 | Kutscher et al. | 382/145 |
| 7,764,388 B2* | 7/2010 | Addy | 356/625 |
| 7,853,038 B2* | 12/2010 | Lee | 382/100 |
| 7,853,065 B2* | 12/2010 | Mori et al. | 382/141 |
| 8,031,968 B2* | 10/2011 | Ishiga | 382/275 |
| 2002/0037098 A1* | 3/2002 | Beaty et al. | 382/145 |
| 2003/0053676 A1* | 3/2003 | Shimoda et al. | 382/145 |
| 2003/0215122 A1* | 11/2003 | Tanaka | 382/128 |
| 2004/0145753 A1* | 7/2004 | Lim et al. | 356/602 |
| 2004/0164244 A1* | 8/2004 | Hiroi et al. | 250/310 |
| 2004/0174158 A1* | 9/2004 | Iida et al. | 324/207.12 |
| 2006/0045311 A1* | 3/2006 | Shibuya | 382/103 |
| 2006/0115115 A1* | 6/2006 | Nagaoka et al. | 382/103 |
| 2007/0098237 A1 | 5/2007 | Yoo et al. | |
| 2008/0078933 A1* | 4/2008 | Watanabe et al. | 250/307 |
| 2008/0100829 A1* | 5/2008 | Watson | 356/123 |
| 2008/0166017 A1* | 7/2008 | Ito et al. | 382/103 |
| 2008/0166019 A1* | 7/2008 | Lee | 382/106 |
| 2008/0316324 A1* | 12/2008 | Rofougaran et al. | 348/222.1 |
| 2009/0041302 A1* | 2/2009 | Nagaoka et al. | 382/103 |
| 2009/0066490 A1* | 3/2009 | Mitzutani et al. | 340/435 |
| 2009/0214103 A1* | 8/2009 | Tanaka et al. | 382/145 |
| 2010/0134647 A1* | 6/2010 | Orboubadian | 348/222.1 |
| 2010/0158343 A1* | 6/2010 | Bryll | 382/141 |

* cited by examiner

FIG. 16A
FIG. 16B
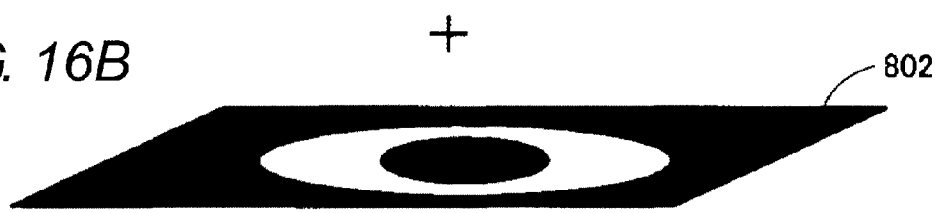
FIG. 16C
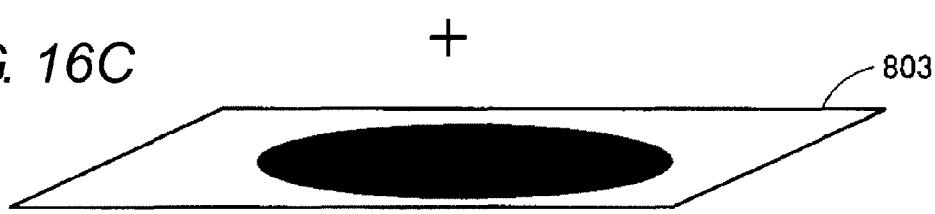
FIG. 16D
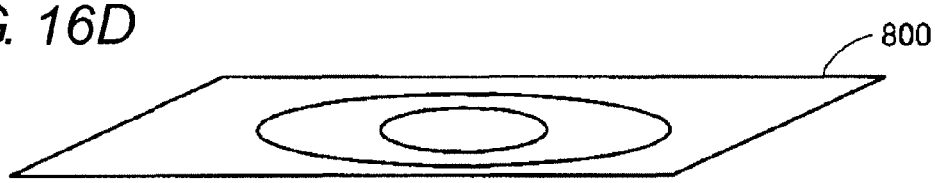

FIG. 21
(A): ORIGINAL IMAGE (EACH PIXEL HAS DENSITY d(x,y))
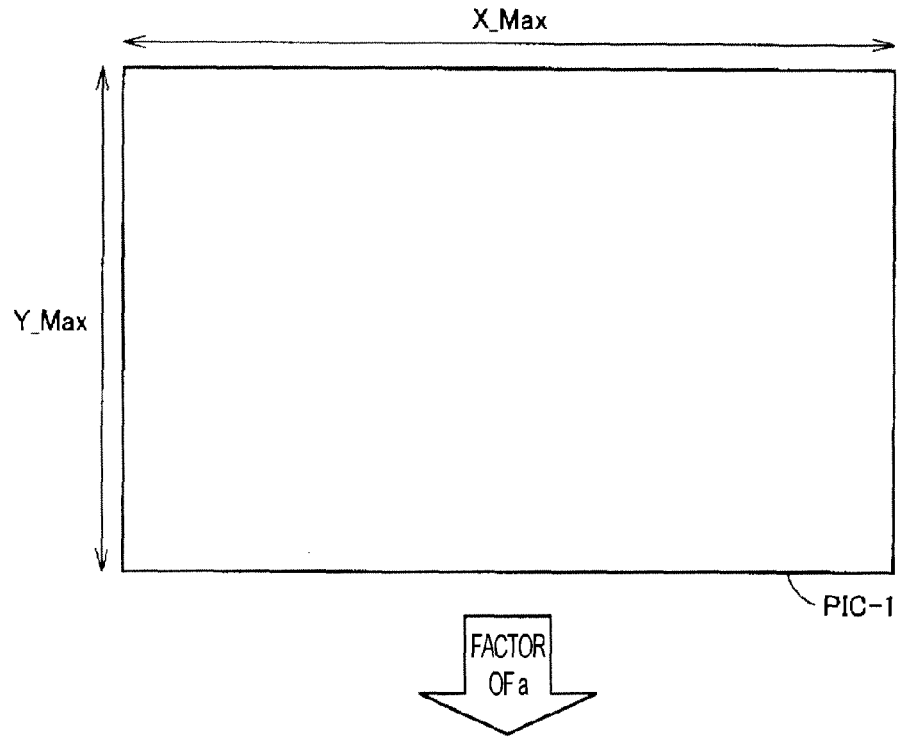
(B): AFTER SIZE CHANGE (EACH PIXEL HAS DENSITY D(x,y))
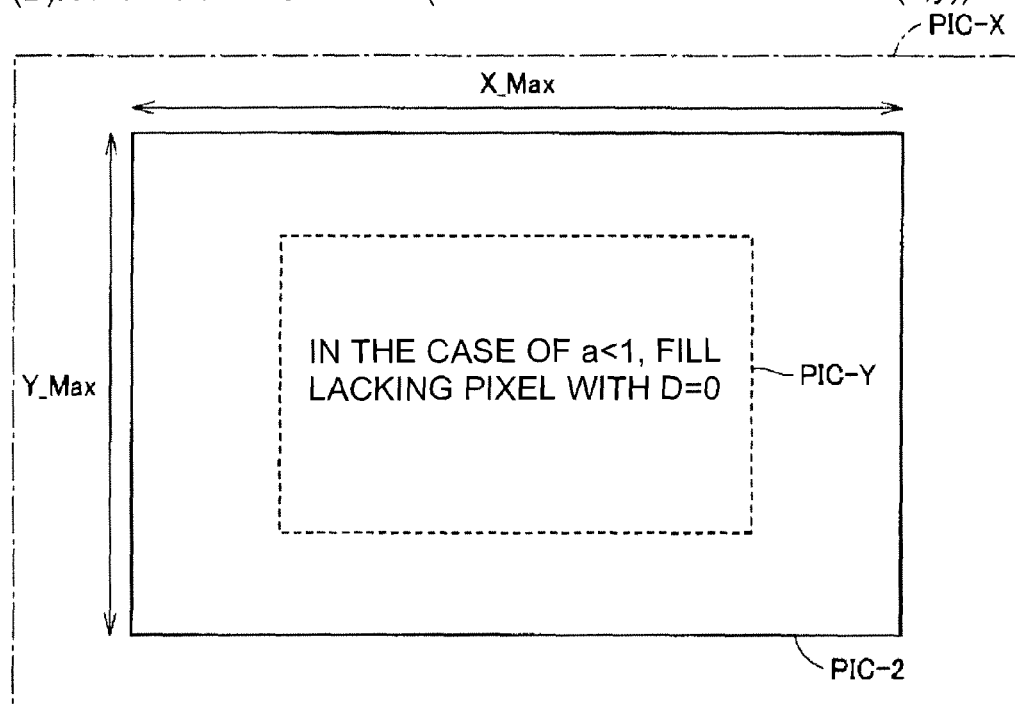
IN THE CASE OF a>1, CUT PORTION OUT OF IMAGE

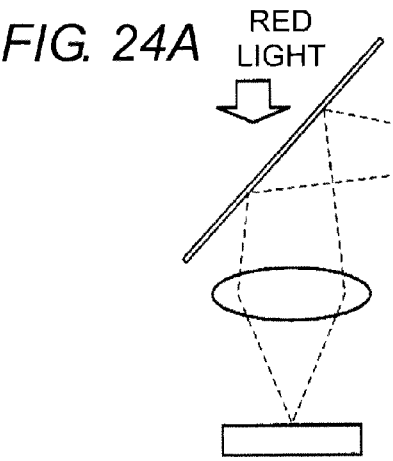

FIG. 24A  RED LIGHT

COME INTO FOCUS ON IMAGING DEVICE IN RED LIGHT BASED ON RESULT OF DISPLACEMENT MEASURING UNIT TO PERFORM IMAGING, AND CORRECT MAGNIFICATION SUCH THAT THE SAME IMAGE FORMATION MAGNIFICATION IS OBTAINED IN THREE COLORS

+

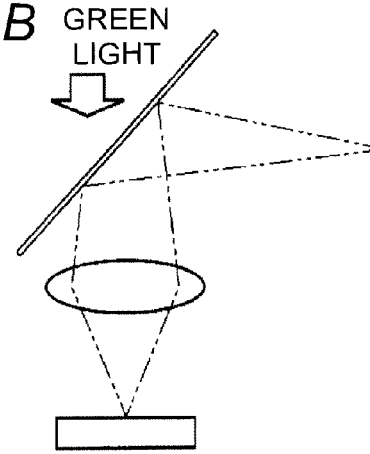

FIG. 24B  GREEN LIGHT

COME INTO FOCUS ON IMAGING DEVICE IN GREEN LIGHT BASED ON RESULT OF DISPLACEMENT MEASURING UNIT TO PERFORM IMAGING, AND CORRECT MAGNIFICATION SUCH THAT THE SAME IMAGE FORMATION MAGNIFICATION IS OBTAINED IN THREE COLORS

+

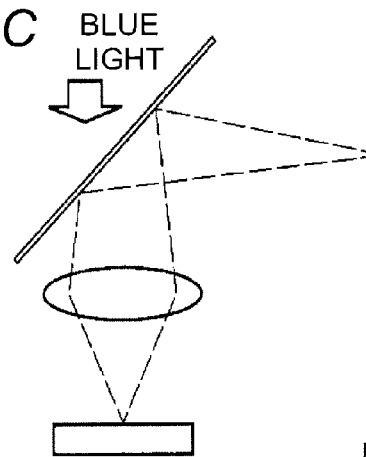

FIG. 24C  BLUE LIGHT

COME INTO FOCUS ON IMAGING DEVICE IN BLUE LIGHT BASED ON RESULT OF DISPLACEMENT MEASURING UNIT TO PERFORM IMAGING, AND CORRECT MAGNIFICATION SUCH THAT THE SAME IMAGE FORMATION MAGNIFICATION IS OBTAINED IN THREE COLORS

↓

THREE IMAGES ARE SUPERIMPOSED TO PRODUCE RED, GREEN, AND BLUE COLOR IMAGE, THEREBY ACHIEVING HIGH DEFINITION

FIG. 28

| | FOCUS ADJUSTMENT VALUE WHILE RED ILLUMINATION LIGHT IS LIT ON: $P_{R1}$ | FOCUS ADJUSTMENT VALUE WHILE GREEN ILLUMINATION LIGHT IS LIT ON: $P_{G1}$ | FOCUS ADJUSTMENT VALUE WHILE BLUE ILLUMINATION LIGHT IS LIT ON: $P_{B1}$ | FOCUS ADJUSTMENT VALUE WHILE RED ILLUMINATION LIGHT IS LIT ON: $P_{R2}$ | FOCUS ADJUSTMENT VALUE WHILE GREEN ILLUMINATION LIGHT IS LIT ON: $P_{G2}$ | FOCUS ADJUSTMENT VALUE WHILE BLUE ILLUMINATION LIGHT IS LIT ON: $P_{B2}$ | CORRECTION FACTOR WHILE RED ILLUMINATION LIGHT IS LIT ON: $X_{R1}$ | CORRECTION FACTOR WHILE GREEN ILLUMINATION LIGHT IS LIT ON: $X_{G1}$ | CORRECTION FACTOR WHILE BLUE ILLUMINATION LIGHT IS LIT ON: $X_{B1}$ | CORRECTION FACTOR WHILE RED ILLUMINATION LIGHT IS LIT ON: $X_{R2}$ | CORRECTION FACTOR WHILE GREEN ILLUMINATION LIGHT IS LIT ON: $X_{G2}$ | CORRECTION FACTOR WHILE BLUE ILLUMINATION LIGHT IS LIT ON: $X_{B2}$ | | |
|---|---|---|---|---|---|---|---|---|---|---|---|---|---|---|
| MEASUREMENT OBJECT HEIGHT: $T_1$ | | | | | | | | | | | | | | |
| MEASUREMENT OBJECT HEIGHT: $T_2$ | | | | | | | | | | | | | | |
| ... | | | | | | | | | | | | | | |

MEASUREMENT APPARATUS

This application is based on Japanese Patent Application No. 2009-061978 filed with the Japanese Patent Office on Mar. 13, 2009, the entire content of which is hereby incorporated by reference.

BACKGROUND OF THE INVENTION

1. Technical Field

The present invention relates to a measurement apparatus in which a displacement of a measurement object is measured in a noncontact way to obtain an image around a measuring point of the displacement.

2. Related Art

For example, Japanese Unexamined Patent Publication No. 10-288508 discloses a measurement apparatus that performs both height measurement and taking of a two-dimensional image around the measuring point with respect to a measurement object such as an electronic circuit board.

In the conventional measurement apparatus, the two-dimensional image of the measurement object is taken with a CCD (Charge-Coupled Device) camera, and the two-dimensional image can be used to visually recognize the measuring point when a semiconductor laser scanner or a laser spot light receiving position detecting device measures a height displacement of the measurement object, or the two-dimensional image can be used to observe whether damage exists in an appearance of the measurement object.

In the measurement apparatus, there is always a strong demand not only to simply observe the appearance of the measurement object but also to realize the measurement with the image.

SUMMARY

The present invention has been devised to solve the problems described above, and an object thereof is to realize the displacement measurement of the measurement object, taking of the two-dimensional image around the measuring point, and computation of a length between two points on the measurement object from the taken image in the measurement apparatus.

In accordance with one aspect of the present invention, a measurement apparatus includes: a displacement measuring unit that measures displacement of a surface of a measurement object; an image obtaining unit that obtains a two-dimensional image of the measurement object with an imaging device; and an image measuring unit that computes a length between two points on the measurement object from the obtained image.

In the measurement apparatus according to the aspect of the present invention, preferably an optical arrangement is controlled such that the image obtaining unit becomes a focused state based on measurement result of the displacement measuring unit.

In the measurement apparatus according to the aspect of the present invention, preferably timing the image obtaining unit obtains an input image from the image measuring unit is controlled based on measurement result of the displacement measuring unit.

Preferably the measurement apparatus according to the aspect of the present invention further includes a storage unit that stores related information indicating a relationship between a relationship between a well-known distance between each two of a plurality of feature points on a specific measurement object with a measurement distance between each two of the plurality of feature points on the image obtained by the image obtaining unit and the measurement result of the displacement measuring unit in obtaining the image of the specific measurement object. In the measurement apparatus, the image measuring unit computes a length between two points on an unknown measurement object from the obtained image of the unknown measurement object based on measurement result of the unknown measurement object by the displacement measuring unit and the related information stored in the storage unit.

In the measurement apparatus according to the aspect of the present invention, preferably the storage unit stores, as the related information with respect to the specific measurement object, a relationship between a well-known distance between each two of the plurality of feature points on the measurement object and a measurement distance between each two of the plurality of feature points on the image obtained by the image obtaining unit in a plurality of distances with the displacement measuring unit and a relationship with measurement result of the displacement measuring unit in obtaining the image of the specific measurement object.

In the measurement apparatus according to the aspect of the present invention, preferably the storage unit stores, as the related information with respect to the specific measurement object, a function expressing relevance of a relationship between a well-known distance between each two of the plurality of feature points on the measurement object and a measurement distance between each two of the plurality of feature points on the image obtained by the image obtaining unit in a plurality of distances with the displacement measuring unit and a measurement result of the displacement measuring unit in obtaining the image of the specific measurement object.

In the measurement apparatus according to the aspect of the present invention, preferably the image measuring unit computes a length between two points on an unknown measurement object based on the related information when receiving input of positions of the two points in the image obtained by the image obtaining unit with respect to the unknown measurement object.

In the measurement apparatus according to the aspect of the present invention, preferably, in each image of the measurement object, the image obtaining unit obtaining the image by controlling an optical arrangement such that a plurality of positions become focused states in an optical axis direction of light in which the imaging device takes the image, the image measuring unit extracts a focused pixel to produce a partial image including the extracted focused pixel, converts the produced partial image with magnification corresponding to the control of the optical arrangement in which the image obtaining unit becomes the focused state, and combines the converted image with the magnification to correct the image obtained by the image obtaining unit.

In the measurement apparatus according to the aspect of the present invention, preferably the image obtaining unit includes an illumination unit that can independently emit pieces of light having a plurality of colors, the optical arrangement is controlled to obtain the image in each color of the light emitted from the illumination unit such that the image obtaining unit becomes the focused state, and, based on the control of the optical arrangement performed to the image obtained in each color of the light emitted from the illumination unit, the magnification of the image obtained in each color of the light emitted from the illumination unit is converted, and an image is produced by combining the converted images.

According to the present invention, the displacement of the surface of the measurement object is measured, the two-dimensional image of the measurement object is obtained based on the measurement result, and the length between two points on the measurement object can be computed from the obtained image.

Accordingly, in the present invention, the measurement result of the displacement of the measurement object surface can be utilized to obtain the two-dimensional image of the measurement object in the measurement apparatus, and therefore the two-dimensional image can be obtained in the operator's desired mode. Further, the length between two points on the measurement object can be computed from the image obtained in the measurement apparatus.

BRIEF DESCRIPTION OF THE DRAWINGS

FIGS. 16A to 16D illustrate processing contents of an obtained image in the measurement apparatus of the seventh embodiment;

FIGS. 21A and 21B schematically illustrate the image data before and after the magnification changing processing of FIG. 20;

FIGS. 24A to 24C illustrate an outline of production of an obtained image in the measurement apparatus of the eighth embodiment;

FIG. 28 illustrates an example of contents of a database used in the pieces of processing of FIGS. 26 and 27.

DETAILED DESCRIPTION

Figure 1:
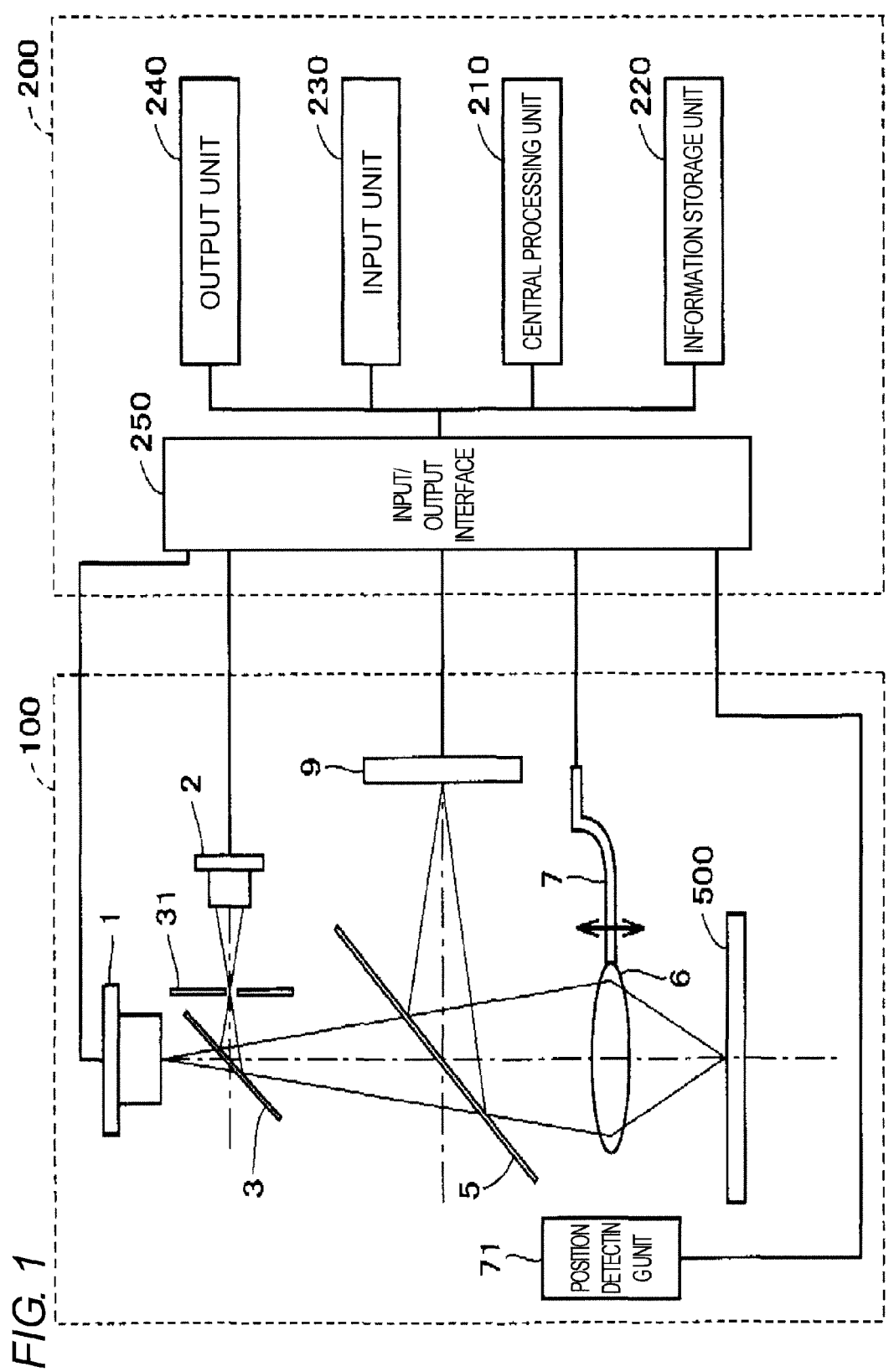
FIG. 1 schematically illustrates an entire configuration of a measurement apparatus according to a first embodiment of the present invention.

Hereinafter, preferred embodiments of the present invention will be described with reference to the drawings. In the drawings, the same component is designated by the same numeral, and the overlapping description is omitted.

First Embodiment

FIG. 1 schematically illustrates an entire configuration of a measurement apparatus according to a first embodiment of the present invention.

The measurement apparatus of the first embodiment includes a sensor head 100 and a controller 200 that controls the sensor head 100.

In the sensor head 100, a laser diode 1 that is of a first light projecting unit emits light having constant intensity. The light emitted from the laser diode 1 is led to an objective lens 6 through a half mirror 3 and a half mirror 5. Then the light is collected onto a surface of a measurement object 500 through the objective lens 6. The objective lens 6 is supported by an oscillator 7. A driving coil (not illustrated) is disposed near the oscillator 7 in order to drive the oscillator 7. A driving circuit (not illustrated) is provided in the sensor head 100 in order to feed electric power to the driving coil. An interval at which a current is passed through the driving coil and an interval at which supply of the current is stopped are alternately repeated in a constant period, thereby periodically oscillating the oscillator 7. The objective lens 6 is moved in directions in which the objective lens 6 comes close to and recedes from the measurement object 500 according to the oscillation of the oscillator 7. In the sensor head 100, a position detecting unit 71 is provided in order to detect a position of the objective lens 6 in an optical axis direction of the light emitted from laser diode 1.

The laser beam emitted from the laser diode 1 toward the measurement object 500 is reflected from the surface of the measurement object 500. The reflected light is received by a photodiode 2 through the objective lens 6, the half mirror 5, the half mirror 3, and a diaphragm hole of a diaphragm plate 31.

The photodiode 2 supplies a light receiving signal to the controller 200. The controller 200 includes an input/output interface 250 that transmits and receives data to and from the sensor head 100, a central processing unit 210 that wholly controls operation of the measurement apparatus, an information storage unit 220 in which a program executed by the central processing unit 210 and various pieces of data are stored, an input unit 230 that includes a keyboard to receive an information input from the outside, and an output unit 240 that includes a monitor to supply information.

The controller 200 performs high-pass filtering and amplifying processing to the light receiving signal supplied from the photodiode 2, converts the light receiving signal into a digital signal, and measures a displacement of the surface of the measurement object 500 based on the digital signal.

In the measurement apparatus of the first embodiment, the objective lens 6 is fixed to the oscillator 7, and a periodical oscillation of the oscillator 7 changes a position of the objective lens 6 in the optical axis direction of the light emitted from the laser diode 1, that is, in the direction indicated by a two-headed arrow on the oscillator 7 of FIG. 1, while the displacement of the surface of the measurement object 500 is measured.

Hereinafter, it is assumed that the optical axis of the light emitted from the laser diode 1 is orientated toward a perpendicular direction, and occasionally the displacement of the measurement object 500 that is measured with the measurement apparatus is referred to as "height change". However, in the measurement apparatus, the displacement measured with the displacement measuring unit is not limited to the height change. When the optical axis of the light emitted from the laser diode 1 is set to a horizontal direction, the measurement apparatus measures a change in position in a horizontal plane as the displacement of the measurement object.

Figure 2:
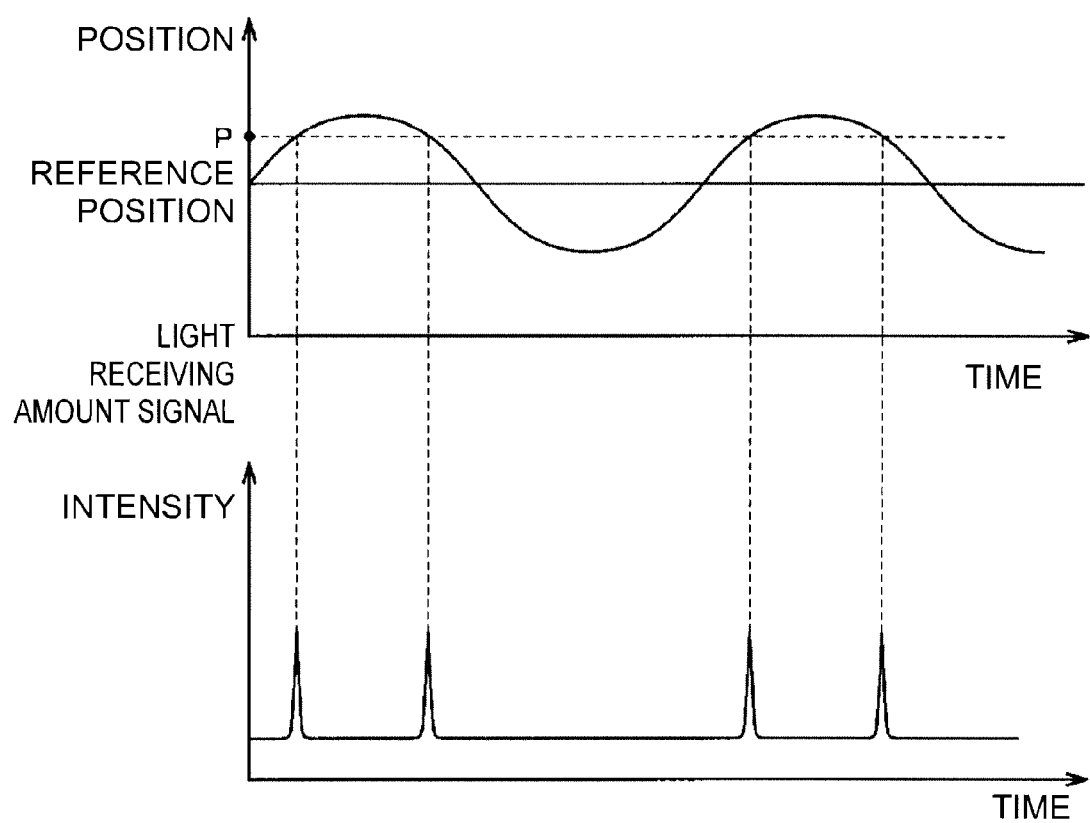
FIG. 2 illustrates a relationship between a signal expressing a position of an objective lens and a light receiving signal obtained by a photodiode in the measurement apparatus of the first embodiment.

FIG. 2 illustrates a relationship between a signal (lens position signal) expressing the position of the objective lens 6 and the light receiving signal obtained by the photodiode 2.

The position detecting unit 71 determines the position of the objective lens 6 in the optical axis direction of the light emitted from the laser diode 1. The lens position signal of FIG. 2 is obtained by arraying the pieces of information on the position of the objective lens 6 in time series. The lens position signal becomes a signal that changes in sinusoidal shape around a static position (reference position) of the oscillator 7.

When the surface of the measurement object 500 is matched with a collecting position of the light that is emitted from the laser diode 1 and collected by the objective lens 6, the light reflected from the measurement object 500 is collected in the position of the diaphragm hole of the diaphragm plate 31. Therefore, the maximum (peak) emerges periodically in the light receiving signal.

In the sensor head 100, the laser diode 1 and the diaphragm hole of the diaphragm plate 31 are disposed in optically conjugate positions in relation to a reflection surface of the half mirror 3.

In FIG. 2, the peak emerges in the light receiving signal when the objective lens 6 is located in a position P. This means that the collecting position of the light collected by the objective lens 6 is matched with the surface of the measurement object 500 when the objective lens 6 is placed in the position P.

In the first embodiment, for example, a conversion table expressing a relationship between the lens position signal and a distance from a predetermined position of the sensor head 100 to the collecting position of the light collected toward the measurement object 500 is previously determined, and a distance to the measurement object 500 existing in the light collecting position is obtained using the conversion table based on the position of the objective lens 6 when the peak emerges in the light receiving signal. A displacement amount of the surface of the measurement object 500 is determined in the optical axis direction by a position change amount of the objective lens 6.

The sensor head 100 also includes an imaging device 9 that takes a two-dimensional image and a two-dimensional image illumination unit (not illustrated). The two-dimensional image illumination unit illuminates the measurement object 500 with the light. The light is reflected from measurement object 500, led to the half mirror 5 through the objective lens 6, reflected from the half mirror 5, and delivered to the imaging device 9 to form an image.

The sensor head 100 is configured such that the half mirror 3 and the half mirror 5 differ from each other in a wavelength of the reflected (or transmitted) light. The photodiode 2 receives the light reflected from the half mirror 3 through the half mirror 5.

In the measurement apparatus of the first embodiment, the displacement measuring unit includes the photodiode 2, the objective lens 6, the position detecting unit 71, the measurement object 500, the half mirror 3, the diaphragm plate 31, the photodiode 2, and the controller 200.

In the measurement apparatus of the first embodiment, the image obtaining unit includes the imaging device 9, the two-dimensional image illumination unit (not illustrated), the objective lens 6, the half mirror 5, and the controller 200.

Figure 3:
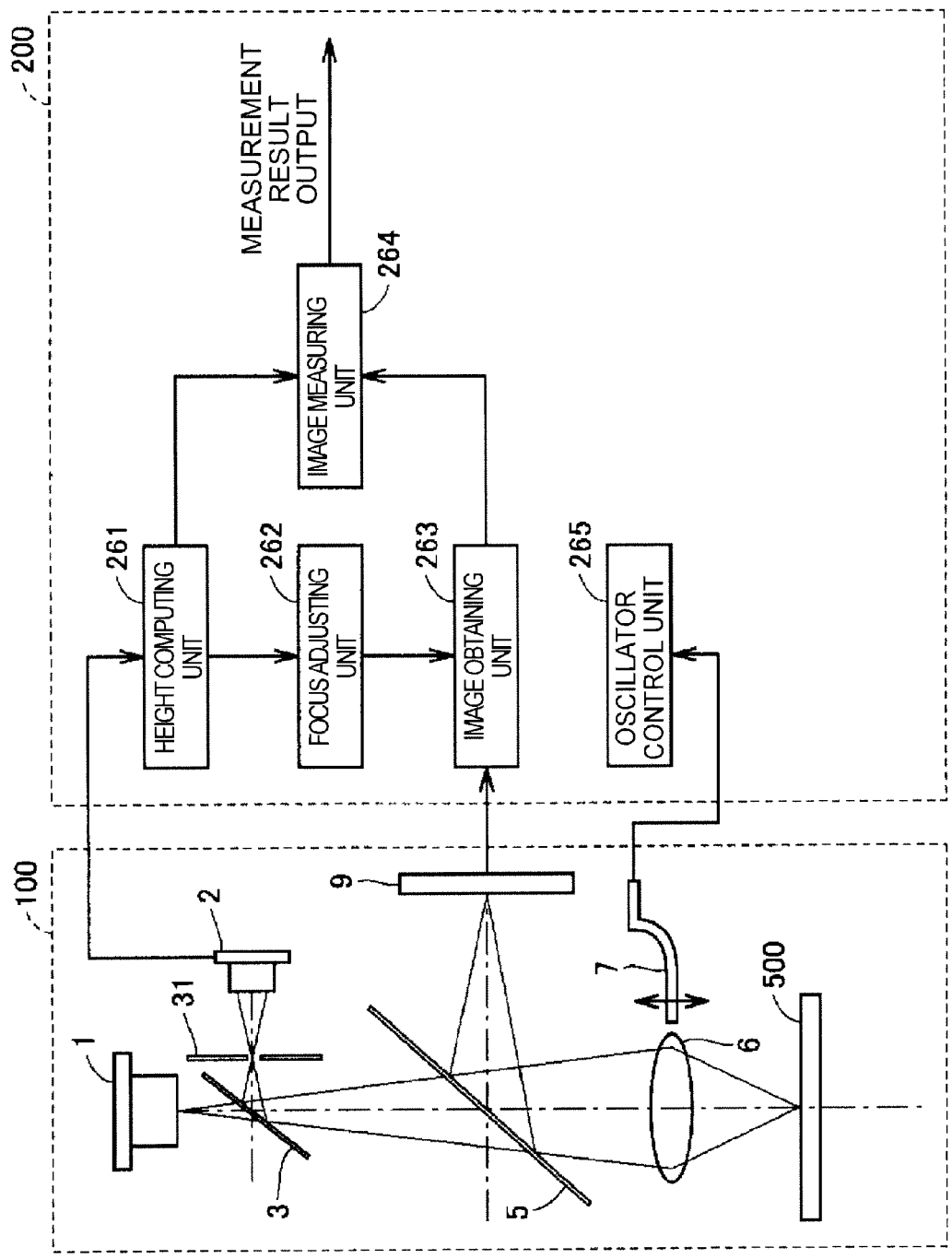
FIG. 3 illustrates a block configuration of the measurement apparatus of the first embodiment.

FIG. 3 illustrates a block configuration of the controller 200 in the hardware configuration of the first embodiment of FIG. 1.

Referring to FIG. 3, the controller 200 includes a height computing unit 261, a focus adjusting unit 262, an image obtaining unit 263, an image measuring unit 264, and an oscillator control unit 265. The light receiving signal of the photodiode 2 is fed into the height computing unit 261, and the height computing unit 261 computes a relative height position of the measurement object 500 based on the light receiving signal. The focus adjusting unit 262 transmits a signal for obtaining the image to the imaging device 9, and the signal for obtaining the image is transmitted at the timing the imaging device 9 comes into focus based on the computation result of the height computing unit 261. The image obtaining unit 263 performs various pieces of processing to image data obtained by the imaging device 9. The image measuring unit 264 measures a length between any two points in the obtained image based on the computation result of the height computing unit 261 and the image obtained by the imaging device 9, and the image obtained by the imaging device 9 is fed from the image obtaining unit 263. The oscillator control unit 265 controls an oscillation mode of the measurement object 500.

Each constituent included in the controller 200 may be implemented in the form of hardware by electric circuits having independent functions, or each constituent may be realized in the form of software such that the central processing unit 210 executes a corresponding program stored in the information storage unit 220.

Figure 4:
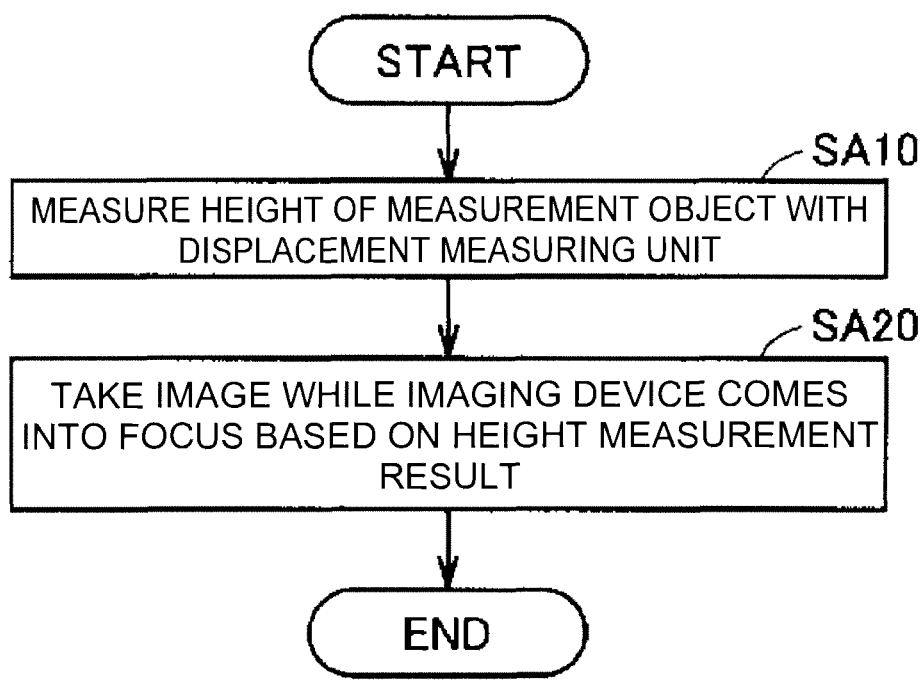
FIG. 4 illustrates a flowchart of processing for adjusting a focus of an imaging device in the measurement apparatus of the present invention.

FIG. 4 illustrates a flowchart of processing for adjusting a focus of the imaging device 9 in the measurement apparatus of the first embodiment.

Referring to FIG. 4, the controller 200 causes the displacement measuring unit of the sensor head 100 to supply the light receiving signal of the photodiode 2 in order to measure the height of the measurement object 500, and the controller 200 measures the height of the surface of the measurement object 500 based on the light receiving signal (Step SA10).

In Step SA20, the controller 200 determines the image obtaining timing based on the height of the measurement object 500 (the height of the measurement object 500 is computed by the height computing unit 261 in Step SA10).

Specifically, the focus adjusting unit 262 refers to a table illustrated in TABLE 1 to obtain a focus adjustment value P corresponding to a height T of measurement object 500, which is computed by the height computing unit 261, and the focus adjusting unit 262 transmits an image obtaining signal to the imaging device 9 at the timing the focus adjustment value P is realized.

TABLE 1

| Measurement object height T | Focus adjustment value P |
|---|---|
| $T \geq T_1$ | $P_1$ |
| $T_1 > T \geq T_2$ | $P_2$ |
| $T_2 > T \geq T_3$ | $P_3$ |
| . | . |
| . | . |
| . | . |

For example, the table illustrated in TABLE 1 is stored in an information storage unit 220. In Step SA20, after the focus of the imaging device 9 is adjusted, the imaging device 9 is caused to take the image.

In the first embodiment, based on the measurement result of the displacement measuring unit, an optical arrangement control unit controls an optical arrangement such that the focus adjusting unit 262 puts the image obtaining unit in the focused state.

Second Embodiment

Figure 5:
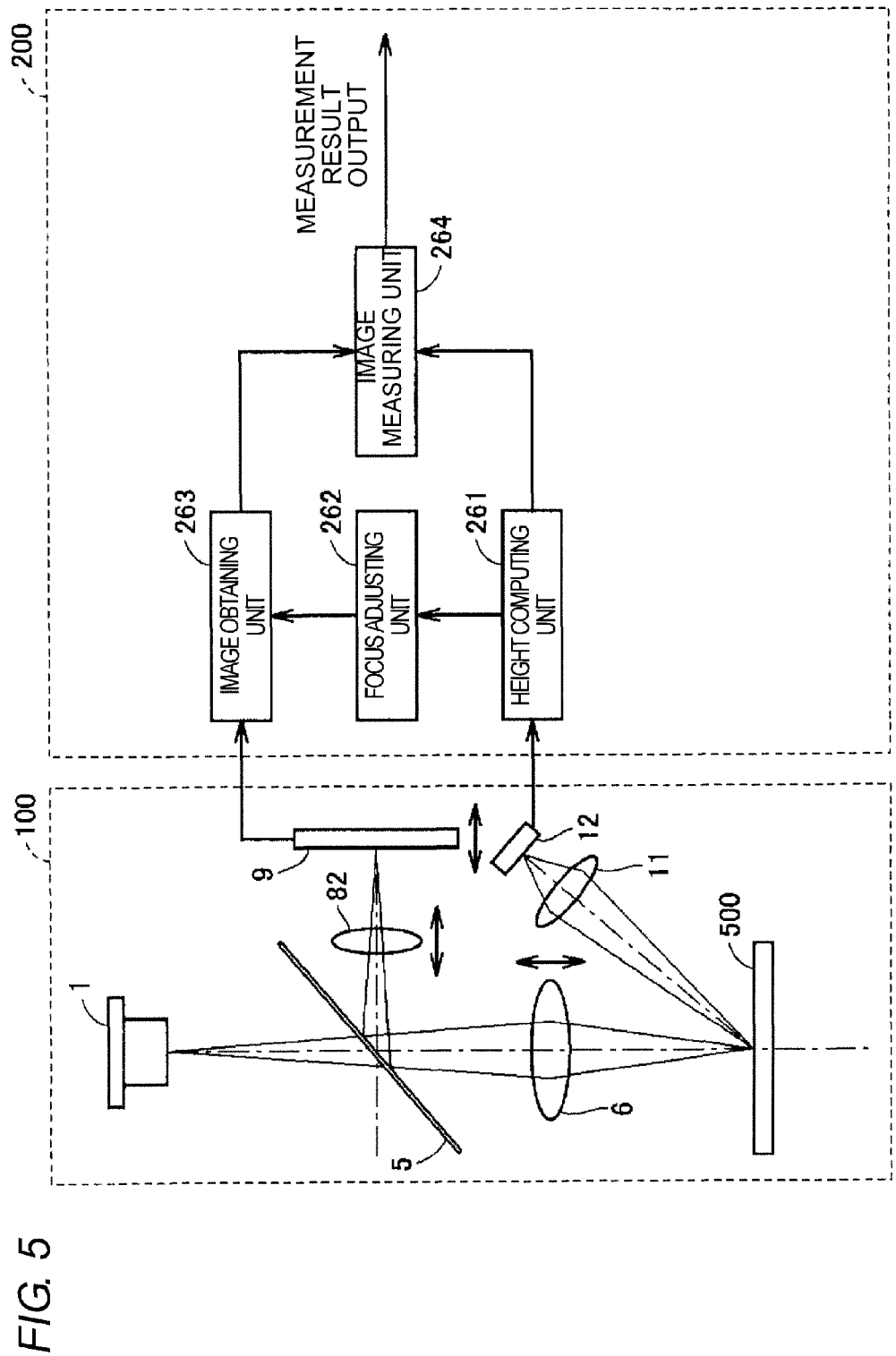
FIG. 5 schematically illustrates an entire configuration of a measurement apparatus according to a second embodiment of the present invention.

FIG. 5 schematically illustrates a measurement apparatus according to a second embodiment of the present invention.

In the measurement apparatus of the second embodiment, as with the sensor head 100 of the first embodiment, the sensor head 100 includes the displacement measuring unit and the image obtaining unit.

In the sensor head 100 of the first embodiment, the displacement measuring unit is formed by the confocal displacement meter. On the other hand, in the sensor head 100 of the second embodiment, the displacement measuring unit is formed by a triangulation displacement meter. Specifically the sensor head 100 of the second embodiment includes a position detecting element 12 and a light receiving lens 12 instead of the half mirror 3, diaphragm plate 31, photodiode 2, and oscillator 7 of the sensor head 100 of the first embodiment.

In the measurement apparatus of the second embodiment, the objective lens 6 narrows down a light flux emitted from the laser diode 1, and the surface of the measurement object 500 is illuminated with the light flux. Part of the diffusely-reflected ray forms a spot on the position detecting element 12 through the light receiving lens 11. The position in which the light spot is formed on the position detecting element 12 depends on a distance between the position detecting element 12 and the measurement object 500. The height computing unit 261 computes the height of a portion illuminated with the spot light on the measurement object 500 based on the position in which the light spot is formed on the position detecting element 12.

In the measurement apparatus of the second embodiment, in order to perform the focus adjustment concerning the image taken by the imaging device 9, a member (focus adjusting member) that changes the position on the optical axis of the objective lens 6 provided between the laser diode 1 and the measurement object 500 or the position on the optical axis of an image formation lens 82 provided between the imaging device 9 and the half mirror 5. The focus adjusting unit 262 computes a focus adjustment value based on the height of the measurement object 500, which computed by the height computing unit 261, and the focus adjusting unit 262 controls the operation of the focus adjusting member in order to realize the focus adjustment value.

In the controller 200 of the second embodiment, as with the controller 200 of the first embodiment, the image obtaining unit 263 obtains the surface image of the measurement object 500 while the focus adjusting unit 262 performs the focus adjustment of the imaging device 9 based on the computation result of the height computing unit 261.

The image measuring unit 264 performs various pieces of processing to the obtained image to supply the measurement result to the output unit 240 or other devices.

Third Embodiment

Figure 6:
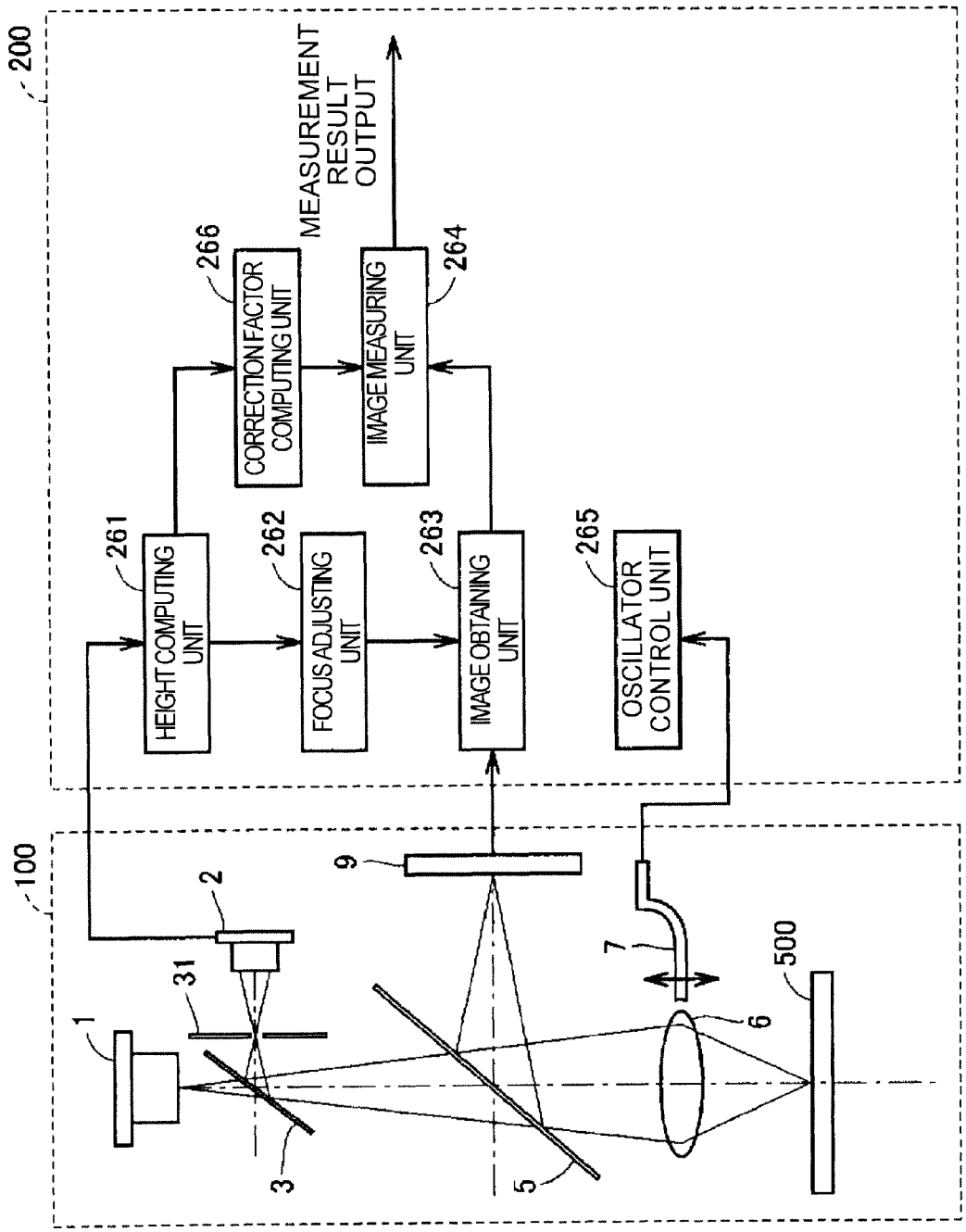
FIG. 6 schematically illustrates an entire configuration of a measurement apparatus according to a third embodiment of the present invention.

FIG. 6 schematically illustrates an entire configuration of a measurement apparatus according to a third embodiment of the present invention.

The sensor head 100 of the third embodiment has a configuration similar to that of the sensor head 100 of the first embodiment.

On the other hand, the controller 200 of the second embodiment includes a correction factor computing unit 266. The correction factor computing unit 266 computes a correction factor based on the height of the measurement object 500, which is computed by the height computing unit 261. The correction factor is used to correct a distance (pixel unit) on the obtained image to an actual distance in consideration of image formation magnification of the image taken by the imaging device 9.

A table illustrated in TABLE 2 in which the height T of the measurement object 500 is correlated with a correction factor Q is stored in the information storage unit 220 (see FIG. 1) of the controller 200.

TABLE 2

| Measurement object height T | Correction factor Q |
|---|---|
| $T \geq T_1$ | $Q_1$ |
| $T_1 > T \geq T_2$ | $Q_2$ |
| $T_2 > T \geq T_3$ | $Q_3$ |
| . | . |
| . | . |
| . | . |

As to the relationship between the height T and the correction factor Q, as the surface of the measurement object 500 is distant from the objective lens 6 (as a value of the height T is decreased), a value of the correction factor Q is increased to largely correct the distance (pixel unit) on the image taken by the imaging device 9. Therefore, in the measurement apparatus of the third embodiment, when the image measuring unit 264 computes the length between two points on the measurement object 500 from the image taken by the imaging device 9, the image measuring unit 264 utilize the correction factor Q to correct the distance on the obtained image with magnification of the correction factor, which is obtained by the correction factor computing unit 266 with respect to the image taken by the imaging device 9. Accordingly, the actual distance can be measured even if the distance between the objective lens 6 and the measurement object 500 is changed.

Fourth Embodiment

Figure 7:
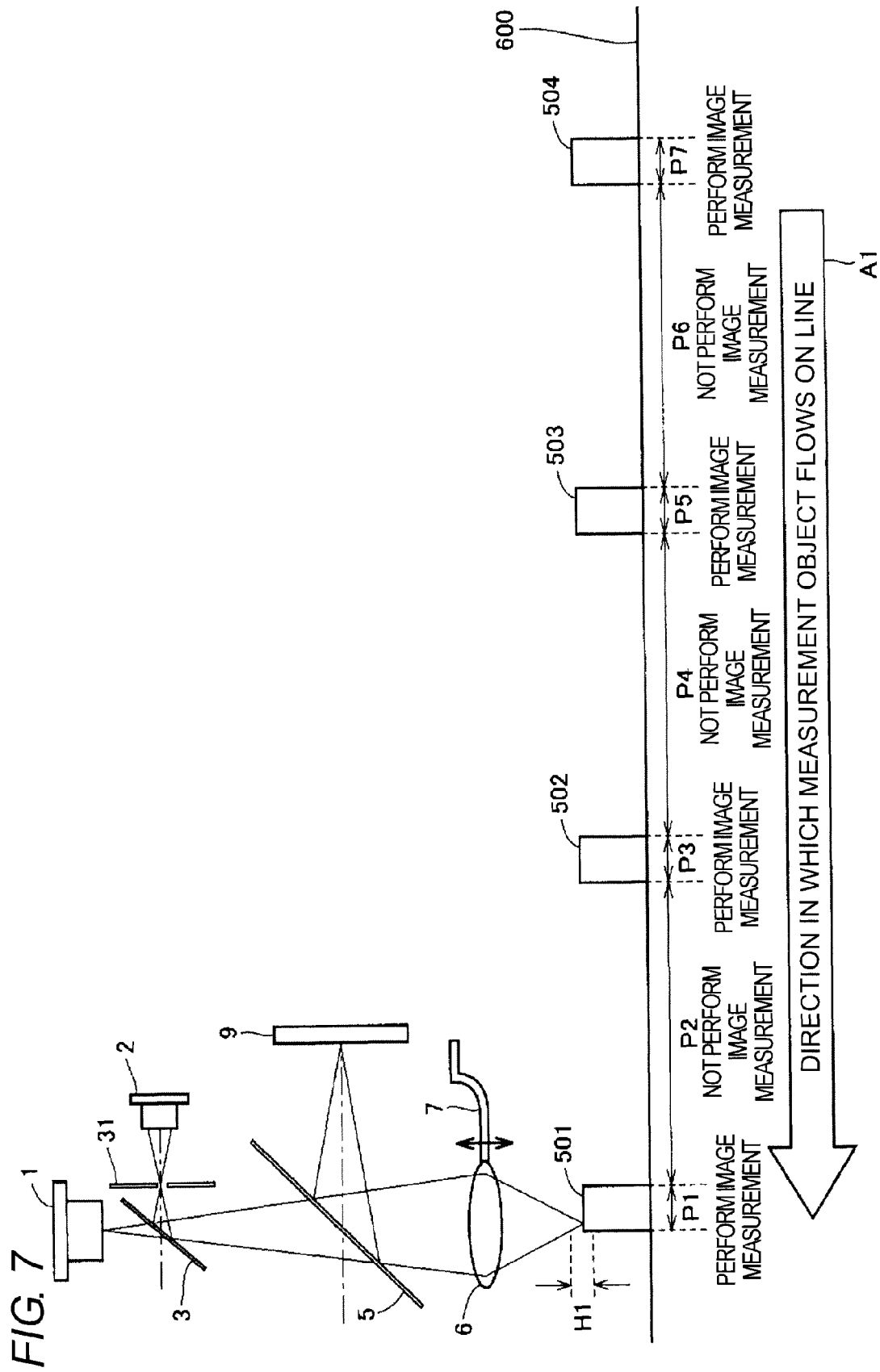
FIG. 7 schematically illustrates a state in which a measurement apparatus according to a fourth embodiment of the present invention continuously obtains images to compute a length between two points in a plurality of measurement objects placed on a belt conveyer.

FIG. 7 schematically illustrates a state in which a measurement apparatus according to a fourth embodiment of the present invention continuously measures displacements of a plurality of measurement objects placed on a belt conveyer.

FIG. 7 schematically illustrates a configuration of only the sensor head portion in the measurement apparatus of the fourth embodiment. Referring to FIG. 7, the measurement apparatus of the fourth embodiment is installed above a belt conveyer 600. On the belt conveyer 600, a plurality of measurement objects 501 to 504 are disposed at intervals in a flowing direction A1 of the belt conveyer 600. The flow of the belt conveyer 600 sequentially positions the measurement object 501, the measurement object 502, the measurement object 503, and the measurement object 504 immediately below the sensor head of the fourth embodiment.

In the flow of the belt conveyer 600 in the direction of the arrow A1, when the displacement measuring unit of the sensor head continuously measures the displacement, because an interval P1, an interval P2, an interval P3, an interval P4, an interval P5, an interval P6, and an interval P7 differ from one another in a surface height measured by the displacement measuring unit, the measurement result of the height varies in the measurement apparatus. At this point, the surface of the measurement object 501 is illuminated with the spot light emitted from the laser diode 1 at the interval P1, the belt conveyer 600 between the measurement object 501 and the measurement object 502 is illuminated with the spot light at the interval P2, the measurement object 502 is illuminated with the spot light at the interval P3, the belt conveyer 600 between the measurement object 502 and the measurement object 503 is illuminated with the spot light at the interval P4, the measurement object 503 is illuminated with the spot light at the interval P5, a region between the measurement object 503 and the measurement object 504 is illuminated with the spot light at the interval P6, and the measurement object 504 is illuminated with the spot light at the interval P7. Specifically the intervals P1, P3, P5, and P7 relatively largely differ from the intervals P2, P4, and P6 in the measurement result.

In the measurement apparatus of the fourth embodiment, as to the height measured by the displacement measuring unit, the image used to compute the height between two points on the measurement object is taken by the imaging device 9 only at the interval at which the measurement object is presumed to be illuminated with the spot light emitted from the laser diode 1. Specifically, the image used to compute the height between two points on the measurement object is taken by the imaging device 9, only when the height measurement result of the displacement measuring unit is included within a range H1 of FIG. 7, that is, a range where a predetermined margin is added to the height position in which the surface of the measurement object exists.

Timing control for obtaining the image used to compute the height between two points on the measurement object will be described more specifically with reference to a flowchart of FIG. 8.

Figure 8:
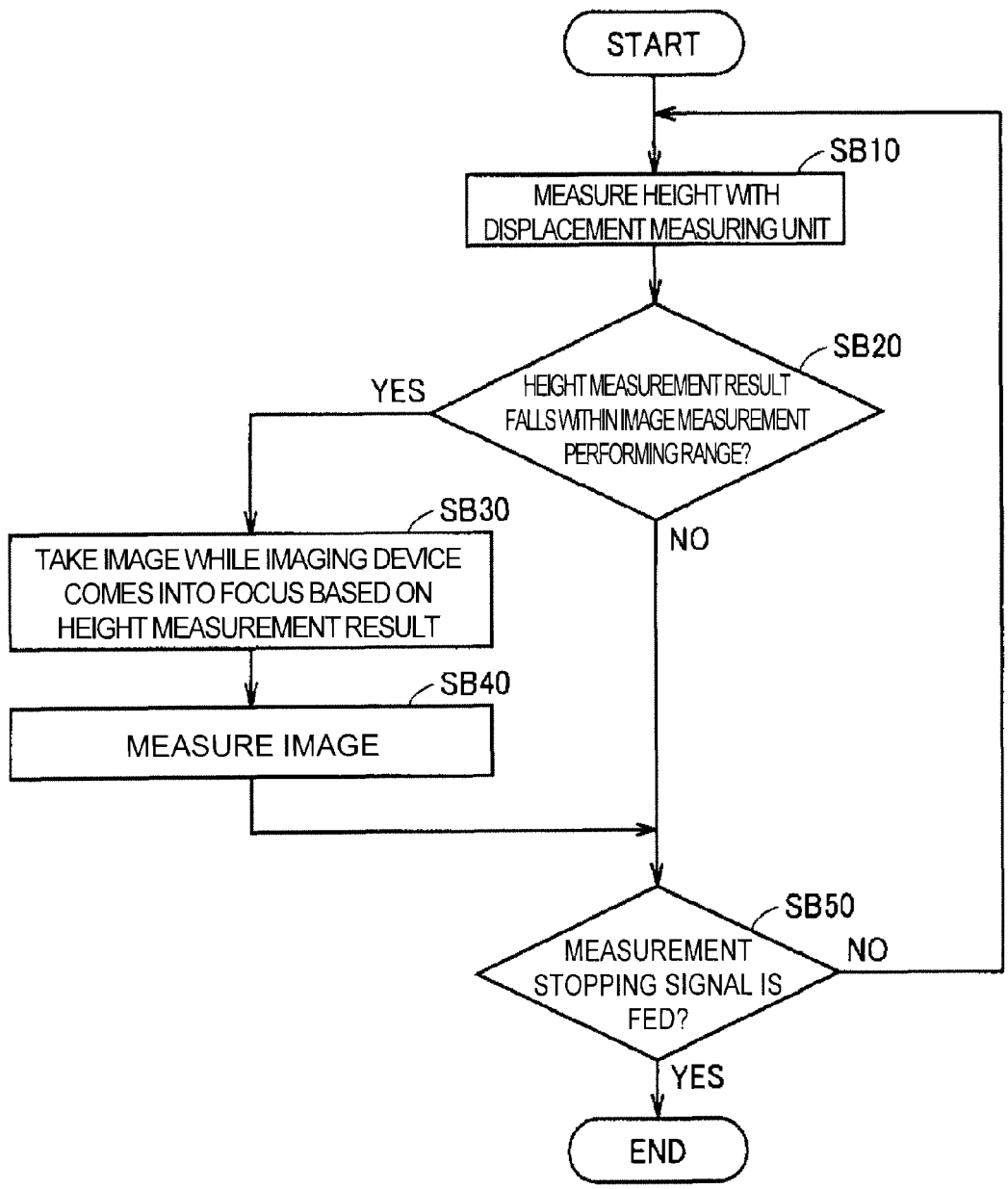
FIG. 8 illustrates a flowchart of processing for determining the timing an image obtaining unit obtains an image to compute a length between two points on the measurement object in the measurement apparatus of the fourth embodiment of the present invention.

Referring to FIG. 8, in the measurement apparatus of the fourth embodiment, the displacement measuring unit starts the height measurement in Step SB10, and a determination whether the height measurement result of the displacement measuring unit falls within an image measurement performing range (range H1 of FIG. 7) is made in Step SB20. The flow goes to Step SB50 when the height measurement result does not fall within the image measurement performing range, and the flow goes to Step SB30 when the height measurement result falls within the image measurement performing range.

A determination whether a measurement stopping signal is fed is made in Step SB50. The measurement stopping signal is a signal that stops the height measurement of the displacement measuring unit and the image taking of the image obtaining unit in the measurement apparatus of the fourth embodiment. For example, an operator performs a specific manipulation to the input unit 230 to input the measurement stopping signal.

When the determination that the measurement stopping signal is not inputted yet is made in Step SB50, the flow return to Step SB10.

When the height measurement result falls within the image measurement performing range in Step SB20, the flow goes to Step SB30. In Step SB30, in the measurement apparatus, the image is obtained at the timing the imaging device 9 comes into focus on the image by the focus adjusting unit (focus adjusting unit 262 of FIG. 3) based on the height measurement result, and the flow goes to Step SB40.

In Step SB40, the image measurement such as the measurement of the distance between any two points in the image is performed to the image obtained in Step SB30, and the flow goes to Step SB50.

When the measurement stopping signal is not fed in Step SB50, the flow returns to Step SB10. On the other hand, when the measurement stopping signal is fed, the measurement processing is ended.

Fifth Embodiment

Figure 9:
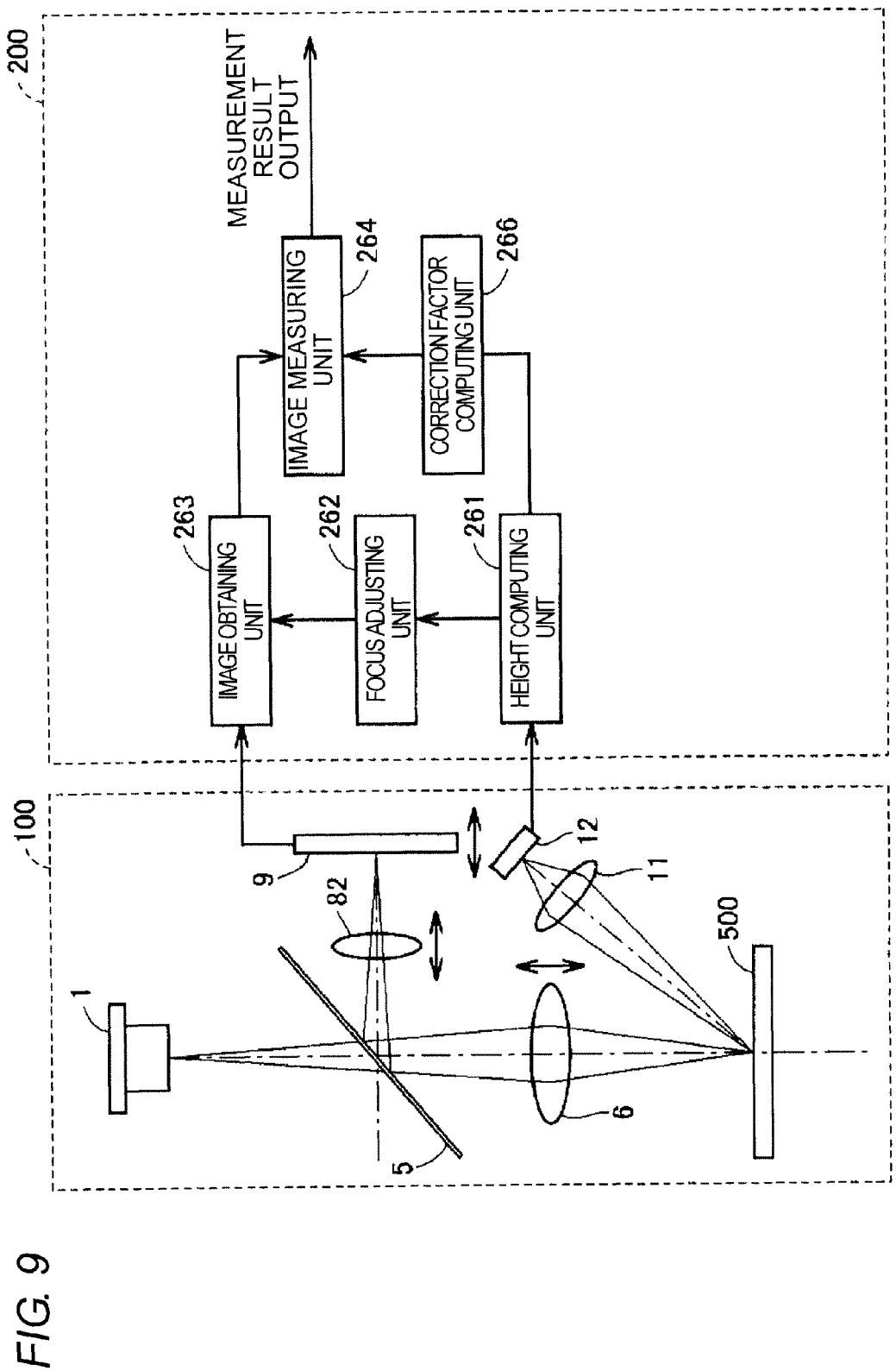
FIG. 9 schematically illustrates an entire configuration of a measurement apparatus according to a fifth embodiment of the present invention.

FIG. 9 schematically illustrates an entire configuration of a measurement apparatus according to a sixth embodiment of the present invention.

In the measurement apparatus of the fifth embodiment, as with the sensor head 100 of the second embodiment of FIG. 5, the displacement measuring unit of the sensor head 100 is formed by the triangulation displacement meter.

As with the controller 200 of the third embodiment, the controller 200 of the measurement apparatus of the fifth embodiment further includes the correction factor computing unit 266. Therefore, the image measuring unit 264 can perform the correct of the computation result of the length between two points on the image to the image obtained by the image obtaining unit 263 according to the correction factor obtained by the correction factor computing unit 266. The correction factor computing unit 266 computes the correction factor that is of a ratio of the distance on the obtained image and the actual distance according to the height measurement result computed by the height computing unit 261, and the correction factor computing unit 266 supplies the correction factor to the image measuring unit 264.

Therefore, in the fifth embodiment, the image taken by the imaging device 9 is displayed on the output unit 240 to receive a manipulation that is performed to select two points in the displayed image through the input unit 230 by the operator, and the actual distance between the specified two points on the measurement object 500 can be computed and supplied.

1) Processing for producing (computing) the "correction factor" that is used to correct the distance between two points on the obtained image to the actual distance between two points on the measurement object 500 by taking the image of the measurement object 500 including two points whose distance is previously well-known, and 2) processing for converting the distance between two points in the obtained image into the actual distance between two points on the measurement object 500 using the correction factor, are required to compute the distance between two points.

Figure 10A:
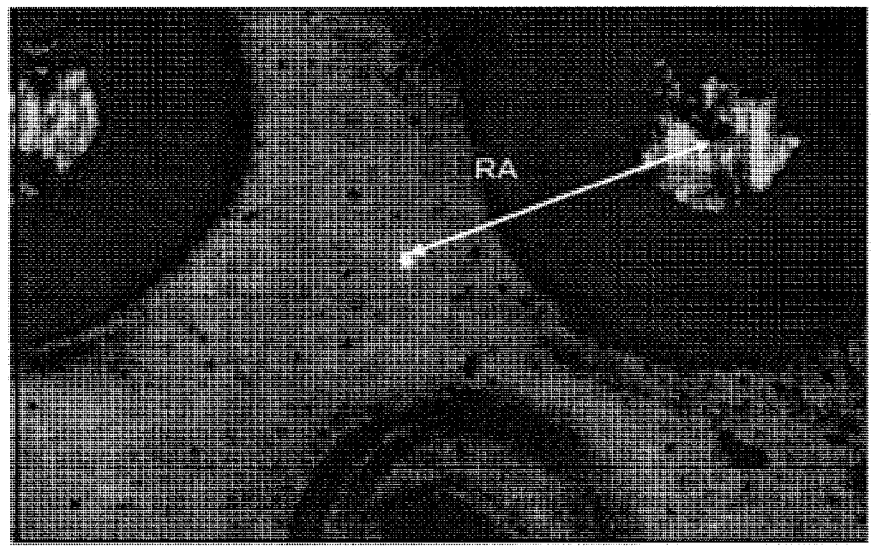
FIGS. 10A and 10B illustrate an example of an image obtained in the measurement apparatus of the fifth embodiment.
Figure 10B:
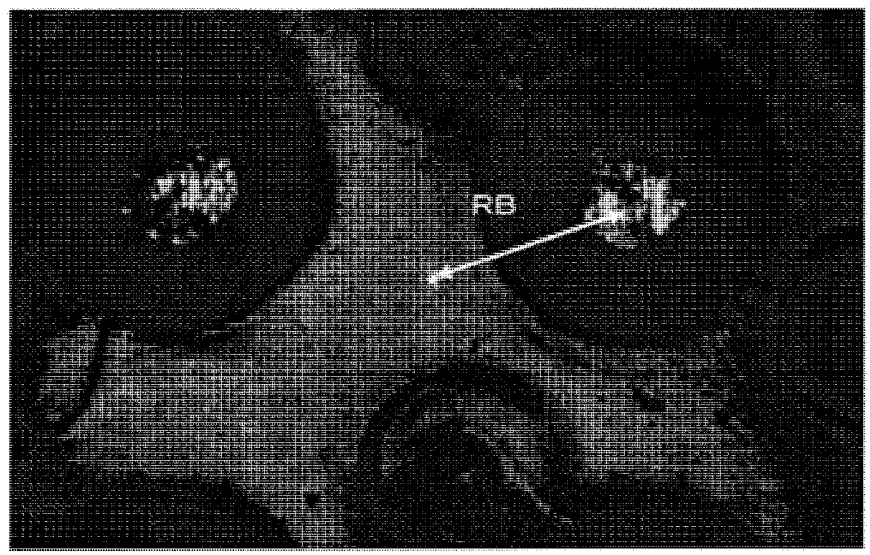

That is, because image formation magnification of the obtained image varies depending on the distance between the objective lens 6 and the measurement object 500, for example, as illustrated in FIGS. 10A and 10B, the same measurement object 500 is displayed in the obtained image with different magnifications. A two-headed arrow RA of FIG. 10A couples the same two points on the measurement object 500 as those of a two-headed arrow RB of FIG. 10B. However, because the image formation magnification of the obtained image of FIG. 10A is larger than that of the obtained image of FIG. 10B, the length of the two-headed arrow RA is longer than that of the two-headed arrow RB. That is, because the obtained images of FIGS. 10A and 10B differ from each other in the image formation magnification, even if the obtained images of FIGS. 10A and 10B correspond to the same distance between two points on the actual measurement object 500, the distance varies in the obtained images having the different image formation magnifications as illustrated by the two-headed arrow RA and the two-headed arrow RB.

Thus, in the fifth embodiment, even in the obtained images having the different image formation magnifications, the distance between two points on the actual measurement object 500 can correctly be computed using the correction factor.

1) The generation of the correction factor and 2) the conversion of the distance between two points in the obtained image will be described below.

(Generation of Correction Factor)

Figure 11:
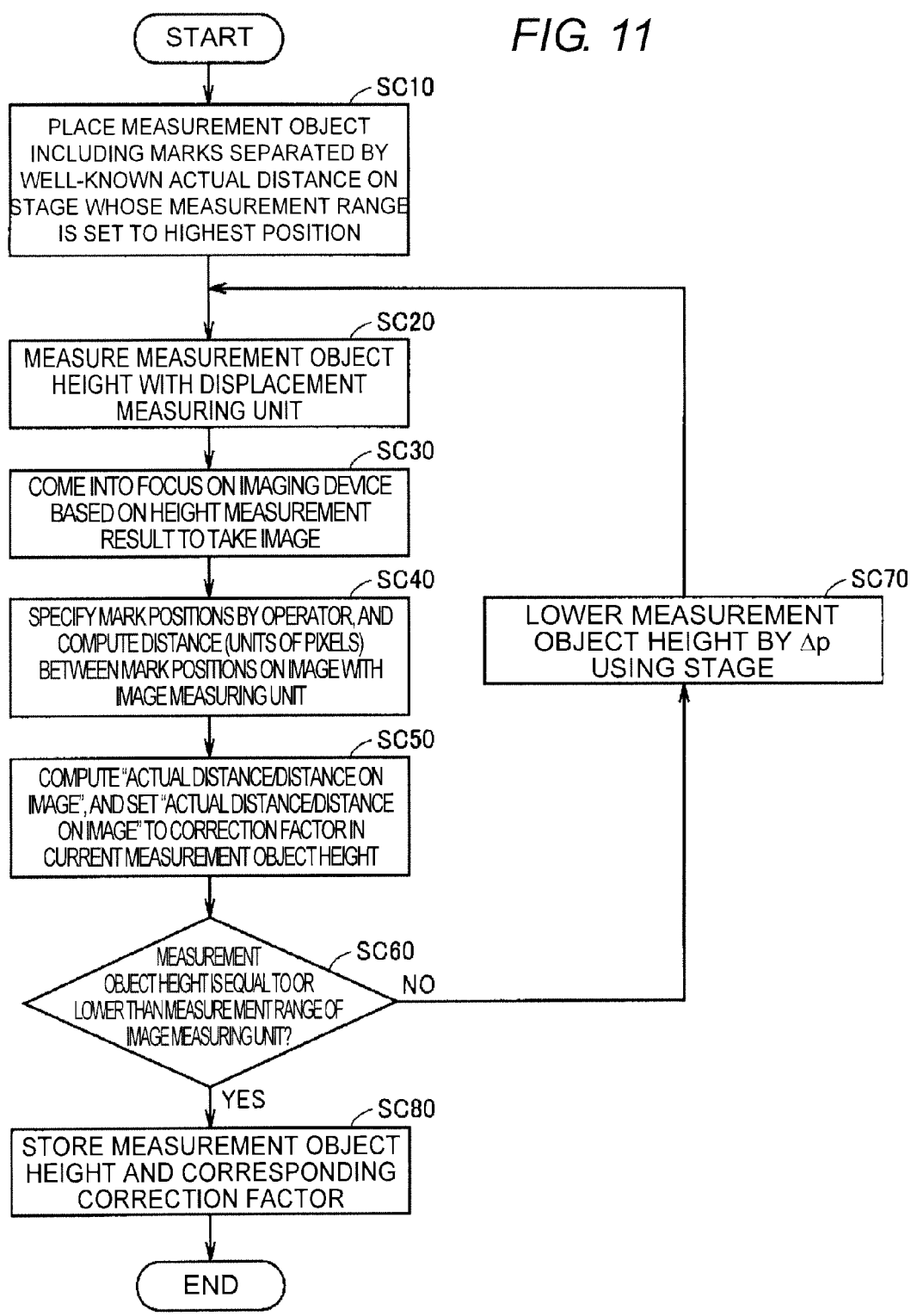
FIG. 11 illustrates a flowchart of correction factor producing processing performed in the measurement apparatus of the fifth embodiment of the present invention.

FIG. 11 illustrates a flowchart of correction factor producing processing.

Referring to FIG. 11, in Step SC10, the measurement object 500 including two point marks separated from each other by a well-known distance is placed on a stage that is set such that the highest position in the measurement range becomes the measurement position of the measurement object 500.

Figure 12:
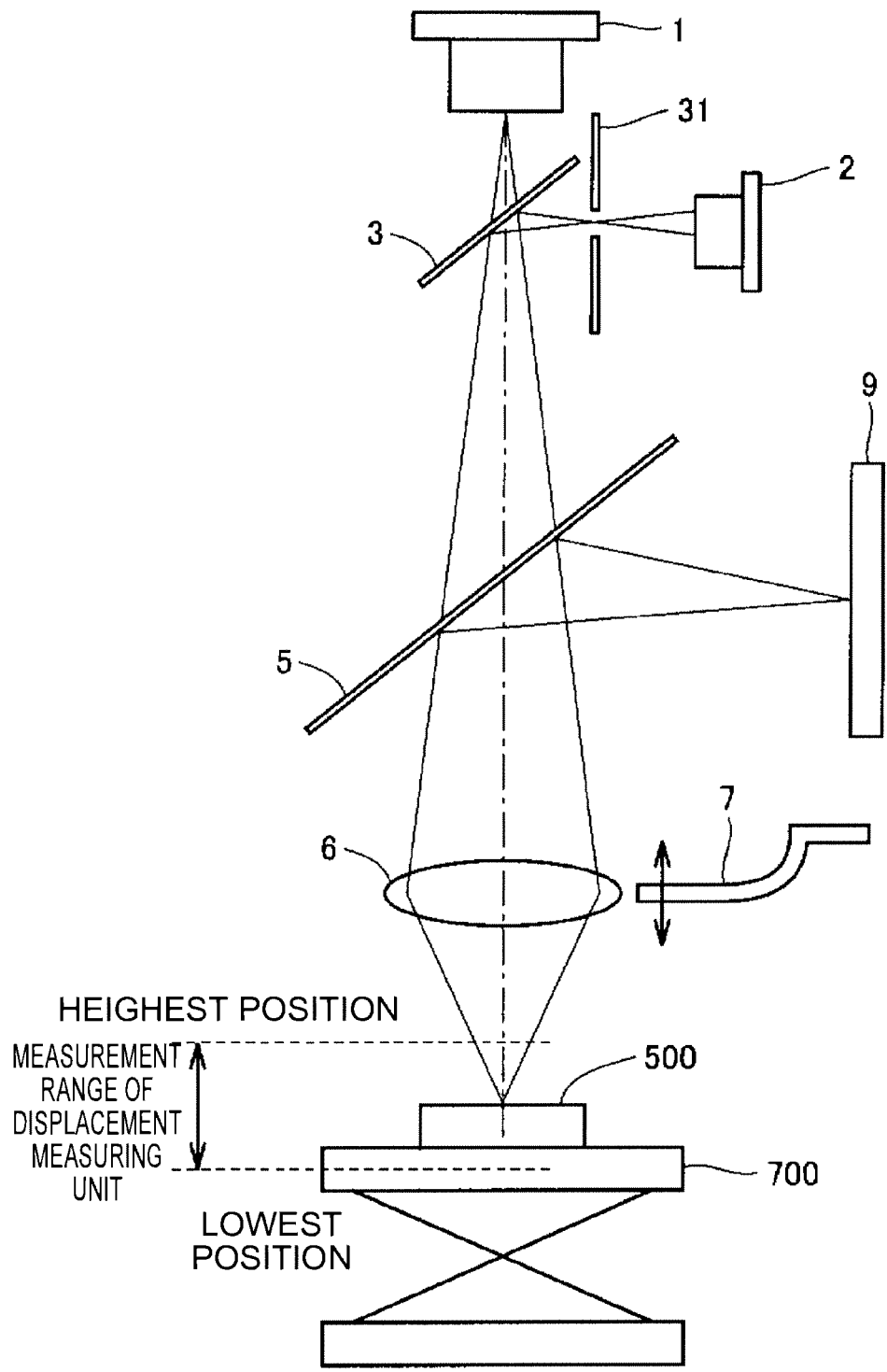
FIG. 12 schematically illustrates the measurement apparatus of the sixth embodiment along with a stage on which a measurement object is placed.

FIG. 12 schematically illustrates the sensor head of the fifth embodiment along with a stage on which the measurement object 500 is placed.

Referring to FIG. 12, the measurement object 500 is placed on a stage 700. The height of the stage 700 in the position on which the measurement object 500 is placed can be changed in the optical axis direction of the laser diode 1.

In Step SC10, as described above, the measurement object 500 is placed on the stage 700 while the stage 700 is set to the highest position.

Referring to FIG. 11, in Step SC20, in the measurement apparatus, the displacement measuring unit measures the height of the measurement object 500.

In Step SC30, after the focus adjusting unit 262 controls the image obtaining timing such that the imaging device 9 comes into focus based on the height measurement result in Step SC20, the imaging device 9 takes the image.

In Step SC30, the taken image is displayed on the output unit 240. In Step SC40, an input of information specifying the mark position for the obtained image displayed on the output unit 240 is received from the operator, the distance (in units of pixels) between the received two points on the obtained image is computed.

In Step SC50, a ratio of the distance on the actual measurement object 500 and the distance on the obtained image is computed, and the computed ratio is stored in the information storage unit 220 as the height correction factor of the height of the measurement object 500 at that time.

In the correction factor producing processing of FIG. 11, the data of the actual distance between the two point marks on the measurement object 500 is obtained on the side of the controller 200 from, for example, the input of the operator. In Step SC50, the correction factor is computed based on the actual distance and the distance on the obtained image.

In Step SC60, a determination whether the position of the measurement object 500 becomes the lowest position within the measurable range of the measurement apparatus is made. When the position of the measurement object 500 does not become the lowest position, the flow goes to Step SC70.

In Step SC70, the height of the stage 700 on which the measurement object 500 is placed is lowered by Δp, and the flow returns to Step SC20.

Through the pieces of processing in Steps SC20 to SC70, in the measurement apparatus, the correction factor is computed in order to convert the distance on the obtained image into the actual distance on the measurement object 500 every time the stage height is changed by Δp, and the correction factor is stored in the information storage unit 220.

When a determination that the computation of the correction factor is performed up to the lowest position in the measurement range of the measurement apparatus is made (YES in Step SC60), the flow goes to Step SC80.

In Step SC80, each height correction factor of the measurement objects 500 computed in Step SC50 is stored in the information storage unit 220, and the correction factor producing processing is ended.

In the fifth embodiment, for example, as illustrated in TABLE 3, a correction factor R (R1, R2, R3, . . . ) is stored in each height of the measurement object 500.

TABLE 3

| Height T | Correction factor R |
| --- | --- |
| $T_1$ | $R_1$ |
| $T_2$ | $R_2$ |
| $T_3$ | $R_3$ |
| . | . |
| . | . |
| . | . |

(Conversion of Distance on Obtained Image)

Figure 13:
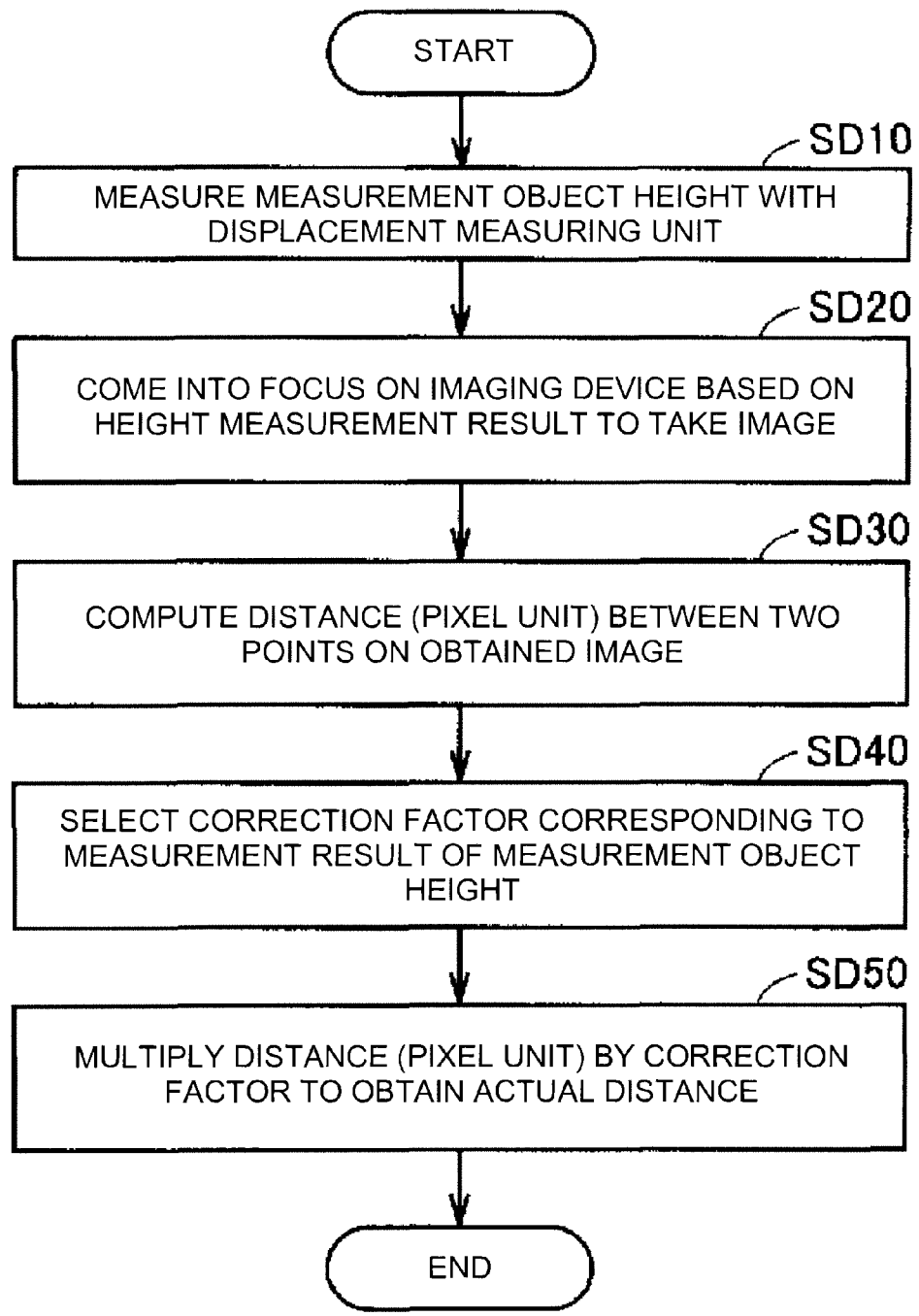
FIG. 13 illustrates a flowchart of processing for converting a distance in the obtained image in the measurement apparatus of the fifth embodiment of the present invention.

FIG. 13 illustrates a flowchart of processing for converting a distance in the obtained image in the measurement apparatus of the fifth embodiment.

Referring to FIG. 13, in converting the distance on the obtained image, in Step SD10, the displacement measuring unit measures the height of the unknown measurement object 500 placed on the stage.

In Step SD20, after the image obtaining timing is controlled such that the imaging device 9 comes into focus based on the height measurement result in Step SD10, the imaging device 9 takes the image, and the image is displayed on the output unit 240.

In Step SD30, the input of any two points is received with respect to the image displayed on the output unit 240, and the distance between the two points on the obtained image is computed.

In Step SD40, the correction factor corresponding to the height measurement result at the time the image is obtained in Step SD20 is selected.

In Step SD50, the actual distance on the measurement object 500 for any two points received in Step SD30 is computed by multiplying the distance on the image obtained in Step SD30 by the correction factor selected in Step SD40, and the processing is ended.

In the fifth embodiment, as illustrated in TABLE 3, the correction factors R are produced and stored with respect to the plurality of height measurement results. When the correction factor R is not stored with respect to the height measurement result obtained in Step SD40, the correction factor of the height close to height measurement result is utilized. For example, the correction factor R2 stored with respect the height T2 is utilized when the height is not lower than the height T2 and lower than the height T3.

Sixth Embodiment

In the fifth embodiment, the correction factor is produced and stored every time the measurement object height is changed by Δp. Alternatively, even if the number of heights of the measurement object 500 necessary to produce the correction factor is decreased, a correction factor computing equation is produced based on the measured value, and the distance in the obtained image may be converted based on the computing equation.

Figure 14:
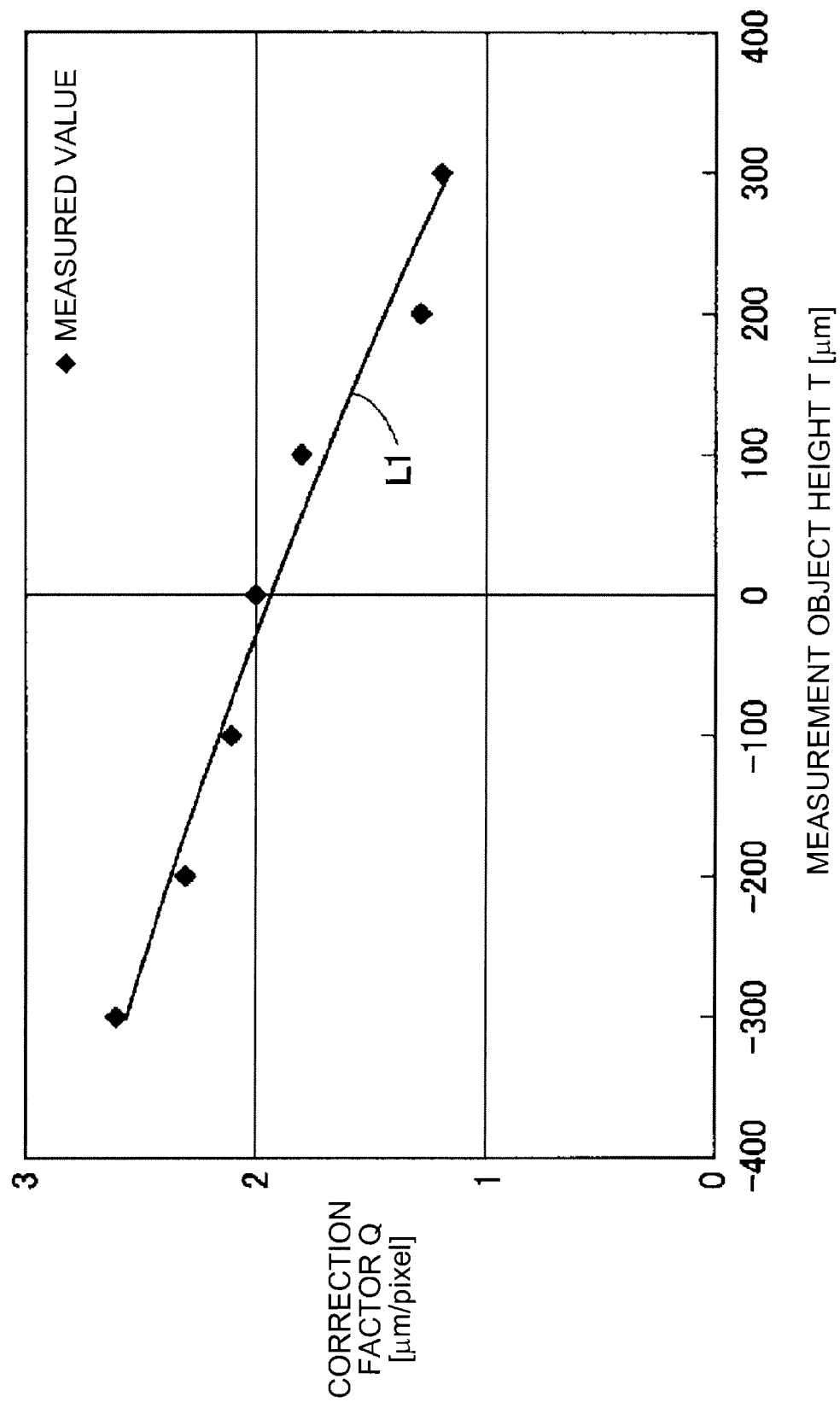
FIG. 14 illustrates a state in which a correction factor computing equation is produced in the measurement apparatus according to a sixth embodiment of the present invention.

In the flowchart of FIG. 11, the correction factor is produced every time the height of the measurement object 500 is changed by Δp. On the other hand, in the sixth embodiment, as illustrated by the measured value of FIG. 14, the correction factors are produced with respect to seven kinds of the heights of the measurement object 500, the seven measured values based on the correction factors are plotted with respect to the measurement object height, and the relationship between the measurement object height and the correction factor is approximated by a quadratic polynomial using a least square method.

It is assumed that the obtained quadratic polynomial is expressed by an equation (1):

$$R = aT2 + bT + c \quad (1)$$

Coefficients (a, b, and c in equation (1)) of the obtained quadratic polynomial are stored in the information storage unit 220.

(Conversion of Distance on Obtained Image)

In the sixth embodiment, during the conversion of the distance on the obtained image, the distance between any two points on the image obtained in Step SD30 of the fifth embodiment is converted into the actual distance of the measurement object 500 using the equation (1).

Seventh Embodiment

Figure 15:
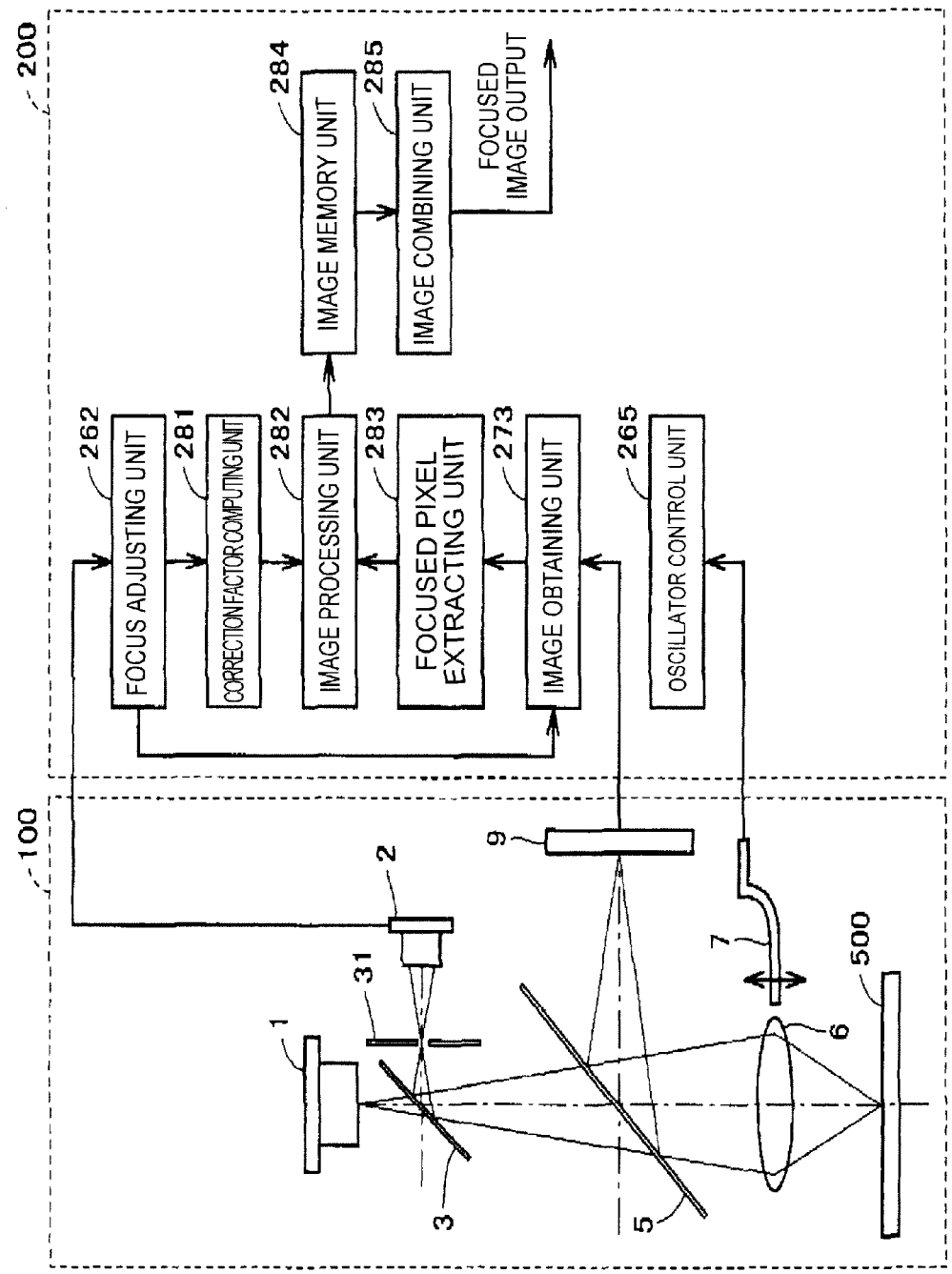
FIG. 15 schematically illustrates an entire configuration of a measurement apparatus according to a seventh embodiment of the present invention.

FIG. 15 schematically illustrates an entire configuration of a measurement apparatus according to a seventh embodiment of the present invention.

Referring to FIG. 15, in the controller 200 of the seventh embodiment, an image obtaining unit 273 obtains the surface image of the measurement object 500 with the imaging device 9. At this point, the focus adjusting unit 262 controls the timing the image of the measurement object 500 is obtained, whereby the surface image of the measurement object 500 comes into focus at a plurality of heights.

In the seventh embodiment, a focused pixel extracting unit 283 extracts the focused pixel in the image taken by the imaging device 9.

On the other hand, in the seventh embodiment, as with the correction factor computing unit 266, a correction factor computing unit 281 previously produces the correction factor based on the focused position.

An image processing unit 282 causes the correction factor computing unit 281 to extract the correction factor for the focused position corresponding to the focused pixel extracted by the focused pixel extracting unit 283, and the image processing unit 282 multiplies the extracted correction factor by (correction factor in reference focused position/correction factor in focused position during obtaining image) such that the image formation magnification of the image including the pixel is equal to that of the reference focused position.

In the seventh embodiment, after the image processing unit 282 enlarges/reduces the images obtained in a plurality of focused positions according to the correction factor corresponding to the focused position, the image processing unit combines the enlarged/reduced images.

Therefore, for example, it is assumed that the measurement object 500 are imaged in three focused positions, and it is assumed that the focused point extracted from each image is located in a white region on the black background in FIGS. 16A to 16C. That is, a region except the region extracted as the focused point is blacked out in each of partial images 801 to 803 of FIGS. 16A to 16C.

Figure 17:
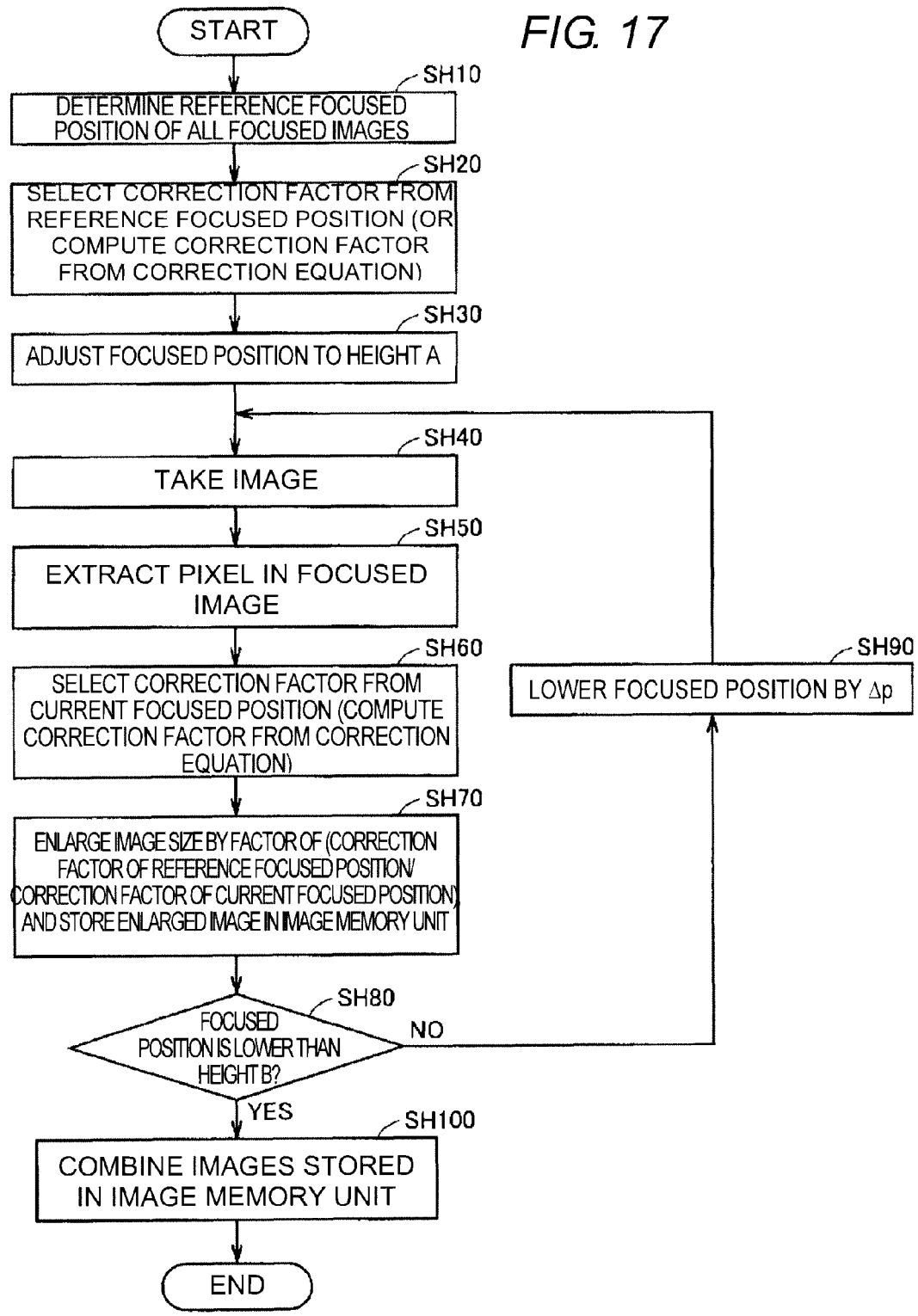
FIG. 17 illustrates a flowchart of image combining processing performed in the measurement apparatus of the seventh embodiment.

FIG. 17 illustrates a flowchart of image combining processing after processing is performed in each focused region according to the correction factor.

Referring to FIG. 17, in Step SH10, the controller 200 determines a reference focused position. For example, the operator of the measurement apparatus sees the images of the measurement object 500 in a plurality of focused positions to select the image, thereby determining the reference focused position.

In Step SH20, the correction factor that is produced according to the reference focused position determined in Step SH10 and stored in the information storage unit 220 is selected. When the correction factor computing equation is produced in the measurement apparatus like the sixth embodiment, the correction factor is computed using the computing equation and the reference focused position in Step SH20.

In Step SH30, the focus adjusting unit determines the image obtaining timing such that the focused position becomes a height A, and the image is obtained. For example, the height A is set to the highest position of the measurement range of the displacement measuring unit of the measurement apparatus as illustrated in FIG. 12.

In Step SH40, the image obtaining unit obtains the image of the measurement object 500.

In Step SH50, the focused pixel extracting unit 283 extracts the focused pixel in the image obtained in Step SH40. Therefore, the region in which the focused point exists is specified in the obtained image like the partial image 801 of FIG. 16A.

In Step SH60, the correction factor corresponding to the focused position at the time the image is obtained in Step SH40 is extracted.

In Step SH70, a value in which the correction factor extracted in Step SH60 is divided by the correction factor in the reference focused position extracted in Step SH20 is computed, and the magnification of the region extracted in Step SH50 is changed with the computed value as the magnification, the image data in accordance with the changed magnification is stored in an image memory unit 284 (information storage unit 220).

In Step SH80, a determination whether the current focused position becomes a height B is made. When the current focused position does not become the height B, the flow goes to Step SH90. For example, the height B is the lowest position in the measurement range of the displacement measuring unit of the measurement apparatus as illustrated in FIG. 12.

In Step SH90, the height of the focused point of the displacement measuring unit is lowered by Δp, and the flow returns to Step SH40. Similarly to Step SH40 through Step SH70, the image is obtained, the focused pixel is extracted, the image of the region including the focused pixel is enlarged (reduced) with the magnification that is obtained based on the correction factors in the current focused position and the reference focused position.

In Step SH80, when the focused position is lowered to the height B or less, the flow goes to Step SH100. In Step SH100, the pieces of image data including the focused positions, stored in the image memory unit 284 in Step SH70, are combined to produce the image. Then the processing is ended. The produced image is displayed on the output unit 240.

That is, in the seventh embodiment, the focused pixel is extracted in each focused position as illustrated by the partial images 801 to 803 of FIGS. 16A to 16C. The processing for enlarging (reducing for the ratio is lower than 1) the partial image by the ratio (magnification) computed by the correction factor of the corresponding focused position and the correction factor of the reference focused position is performed, and the processed image data is stored in the image memory unit 284. The image data is stored from the focused position A to the focused position B. The stored pieces of image data are combined to produce the obtained image.

In the produced image, compared with the image that is taken only in one focused position, the constituents is modified so as to be able to be displayed with the same magnification irrespective of the height of the constituent, even if the image includes a plurality of constituents having different heights.

For example, the focused pixel of the seventh embodiment can be extracted based on the technique disclosed in Japanese Unexamined Patent Publication No. 6-311411.

Figure 18:
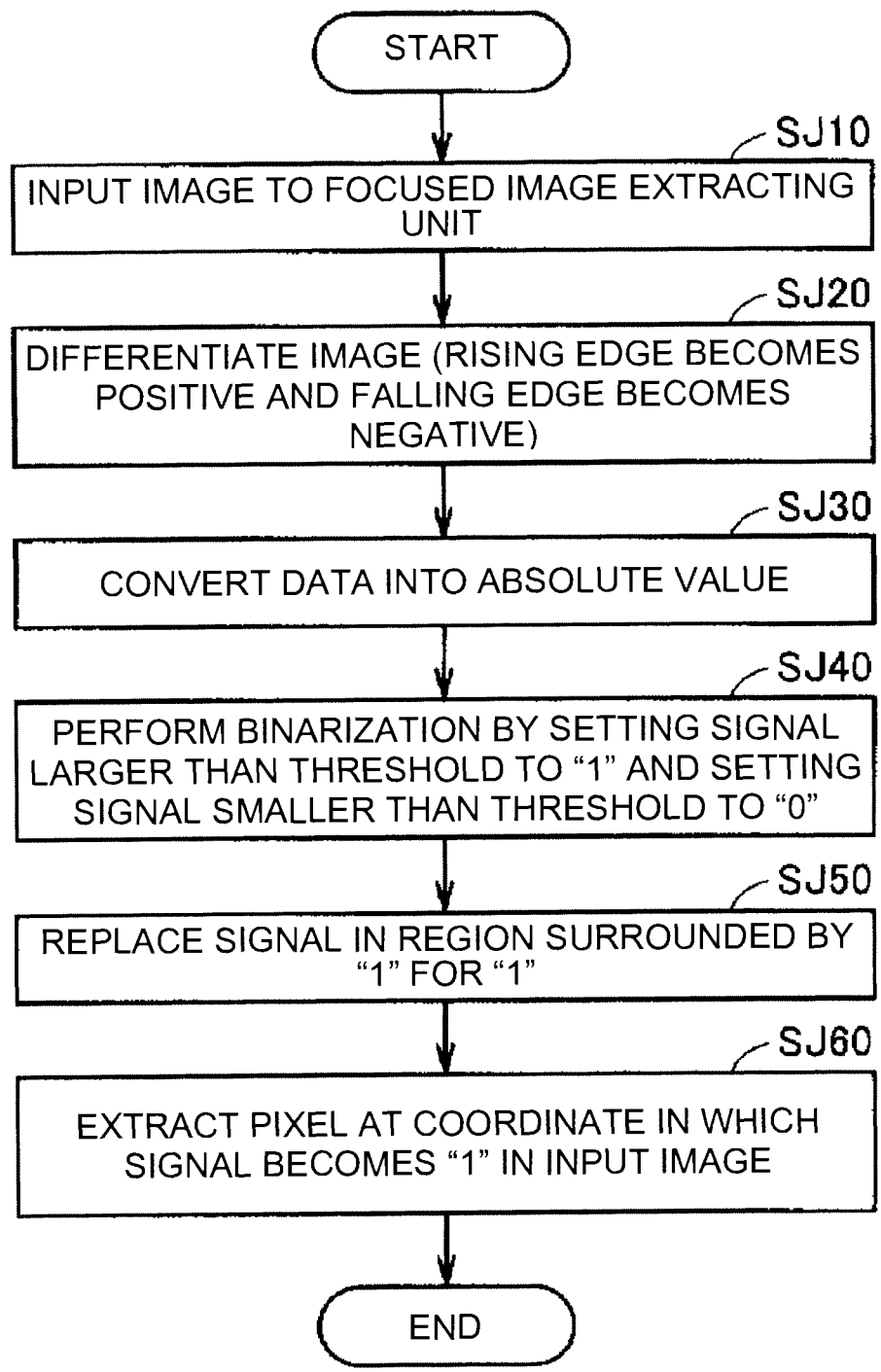
FIG. 18 illustrates a flowchart of focused pixel extracting processing performed in the image combining processing of FIG. 17.
Figure 19:
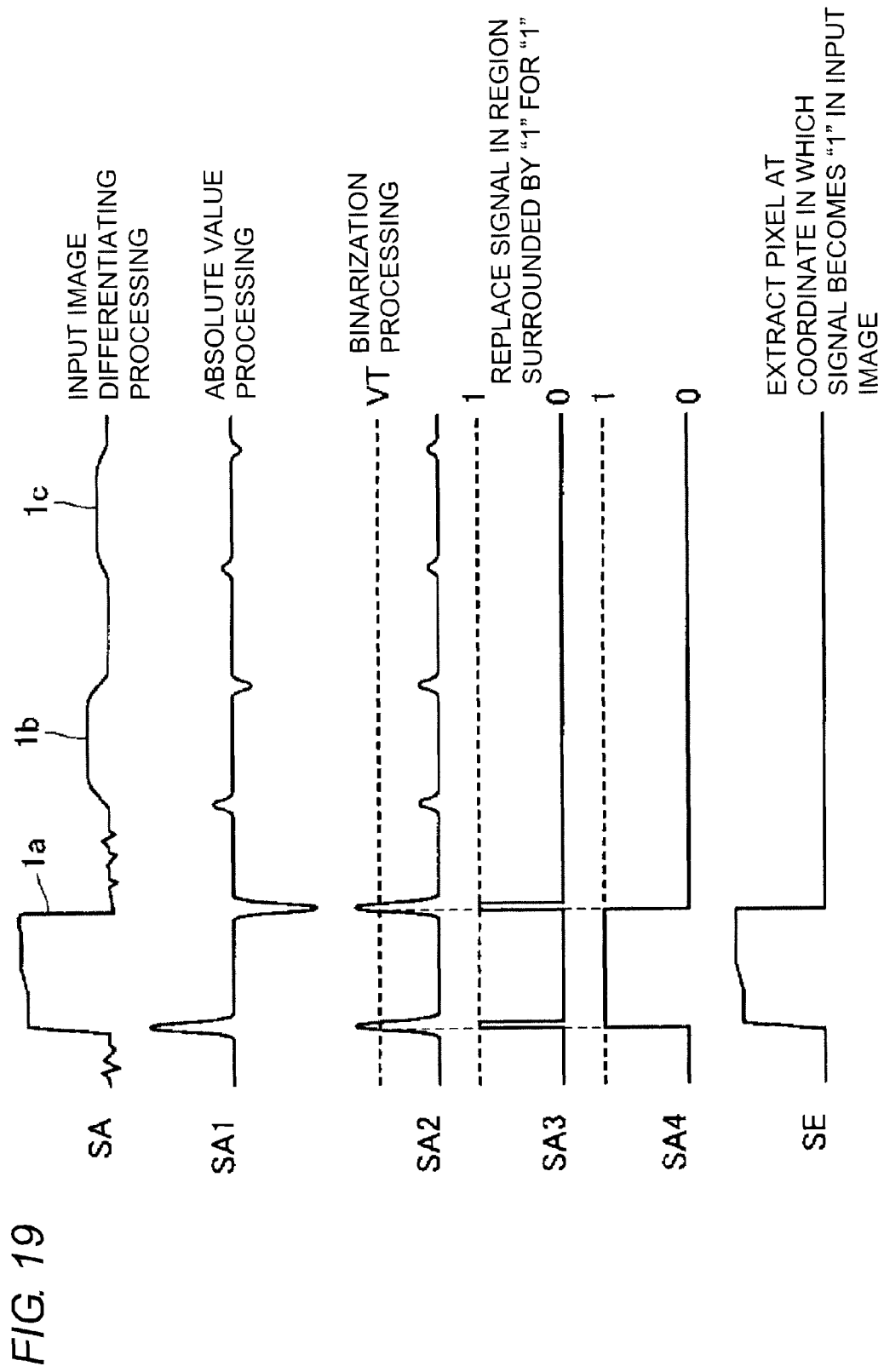
FIG. 19 illustrates an example of data in the focused pixel extracting processing of FIG. 18.

FIG. 18 illustrates a flowchart of focused pixel extracting processing. Referring to FIG. 18, in Step SJ10, the image obtained by the image obtaining unit is inputted to the focused pixel extracting unit 283. FIG. 19 illustrates an example of a brightness profile SA of one line of the input image.

In Step SJ20, the pieces of pixel data constituting the obtained image is differentiated in a predetermined direction. FIG. 19 illustrates an example of data SA1 after the differentiation processing is performed to the brightness profile SA of FIG. 19.

In Step SJ30, processing for converting the data to which the differentiation processing is already performed in Step SJ20 into an absolute value is performed. FIG. 19 illustrates an example of data SA2 in which the processing for converting the data SA1 into the absolute value is already performed.

In Step SJ40, binary processing is performed to the data that is put in the absolute value in Step SJ30. FIG. 19 illustrates an example of data SA3 in which the data SA2 is binarized using a previously set threshold VT.

In Step SJ50, processing for replacing the data in the region surrounded by "1" for "1" is performed to the binarized data in Step SJ40. FIG. 19 illustrates an example of data SA4 to which the processing in Step SJ50 is already performed.

In Step SJ60, the pixel having a coordinate in which the signal (data value) becomes "1" is extracted as the focused pixel from the data to which the pieces of processing in Steps SJ20 to SJ50 is performed (the image data inputted to the focused pixel extracting unit 283). Then the processing is ended.

Contents of the image data size changing processing in Step SH70 will be described with reference to a flowchart of FIG. 20.

In the size changing processing, as schematically illustrated in FIG. 21, an image PIC-X surrounded by an alternate long and short dash line of FIG. 21B or an image PIC-Y surrounded by a broken line is formed, after a size of an original image PIC-1 surrounded by a solid line of FIG. 21A is increased by a factor of a.

As used herein, the factor of a means a value in which the reference height correction factor computed in Step SH70 is divided by the correction factor of the measurement object height.

In the original image of FIG. 21A, a size in an x-direction is set to X_Max, and a size in a y-direction is set to Y_Max.

Figure 20:
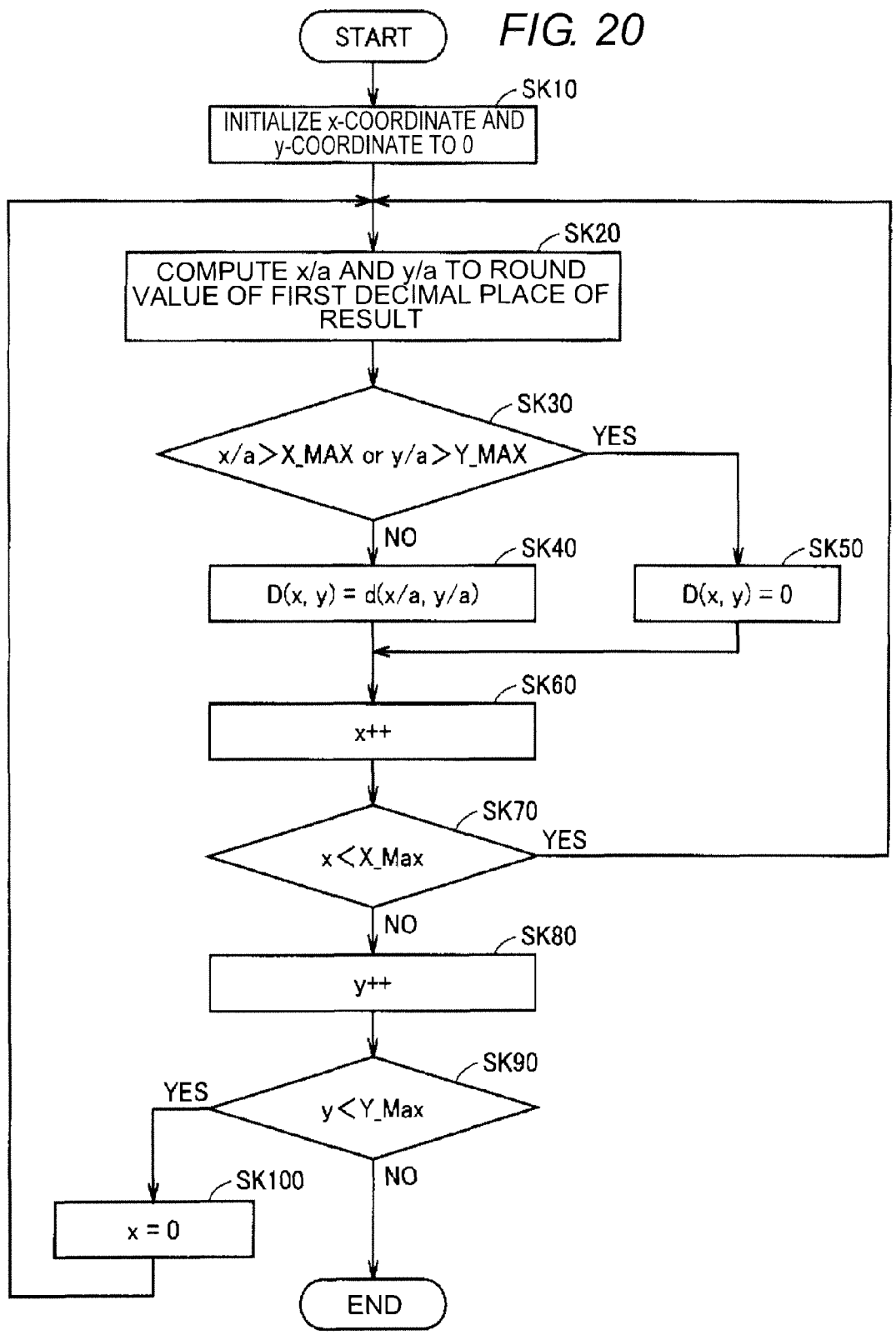
FIG. 20 illustrates a flowchart of processing for changing magnification of image data in the image combining processing of FIG. 17.

Referring to FIG. 20, in Step SK10, an x-coordinate and a y-coordinate of the conversion object are initialized to "0".

In Step SK20, values are computed by dividing the values of the x-coordinate and y-coordinate of the conversion object by a, respectively. At this point, the value computed by rounding the value of the first decimal place is an integer.

In Step SK30, a determination whether the values x/a and y/a computed in Step SK20 exceed X_Max and Y_Max is made. The flow goes to Step SK50 when the values x/a and y/a computed in Step SK20 exceed X_Max and Y_Max, the flow goes to Step SK40 when the values x/a and y/a computed in Step SK20 do not exceed X_Max and Y_Max.

In Step SK40, the pixel value D(x,y) of the post-conversion coordinate (x,y) is set to the pixel value d(x/a,y/a) of the pre-conversion coordinate (x/a,y/a), and the flow goes to Step SK60.

In Step SK50, the pixel value D(x,y) of the post-conversion coordinate (x,y) is set to "0", and the flow goes to Step SK60.

In Step SK60, the value of x is incremented. In Step SK70, a determination whether the value of x exceeds X_Max is made. When the value of x does not exceed X_Max, the flow returns to Step SK20. When the value of x exceeds X_Max, the flow goes to Step SK80.

In Step SK80, the value of y is incremented. In Step SK90, a determination whether the value of y exceeds Y_Max is made. When the value of y does not exceed Y_Max, the flow returns to Step SK20. When the value of y exceeds Y_Max, the flow goes to Step SK100.

In Step SK100, the value (x) of the x-coordinate of the processing object is set to 0. Then the flow returns to Step SK20.

As described above, the original image having the size X_Max in the x-direction and the size Y_Max in the y-direction also has the size X_Max in the x-direction and the size Y_Max in the y-direction even in the post-conversion image data.

This is attributed to the following fact. That is, when a is larger than 1, the x-coordinate of the post-conversion image is produced up to X_Max through the processing in Step SK70, and the y-coordinate of the post-conversion image is produced up to Y_Max through the processing in Step SK90.

For a that is smaller than 1, when the original image is reduced with the magnification of a through the processing in Step SK50, the pixel value D is set to 0 in the pixel that is short with respect to the original image, thereby having the image data.

In the seventh embodiment, even if the image is enlarged/reduced while the magnification of the partial image is changed every focal height, the post-conversion image region of each partial image is identical to the pre-conversion image region.

Therefore, problems of overlapping pixel data or lack pixel data are not generated even if the plurality of images converted with the different magnifications are combined.

Eighth Embodiment

Figure 23:
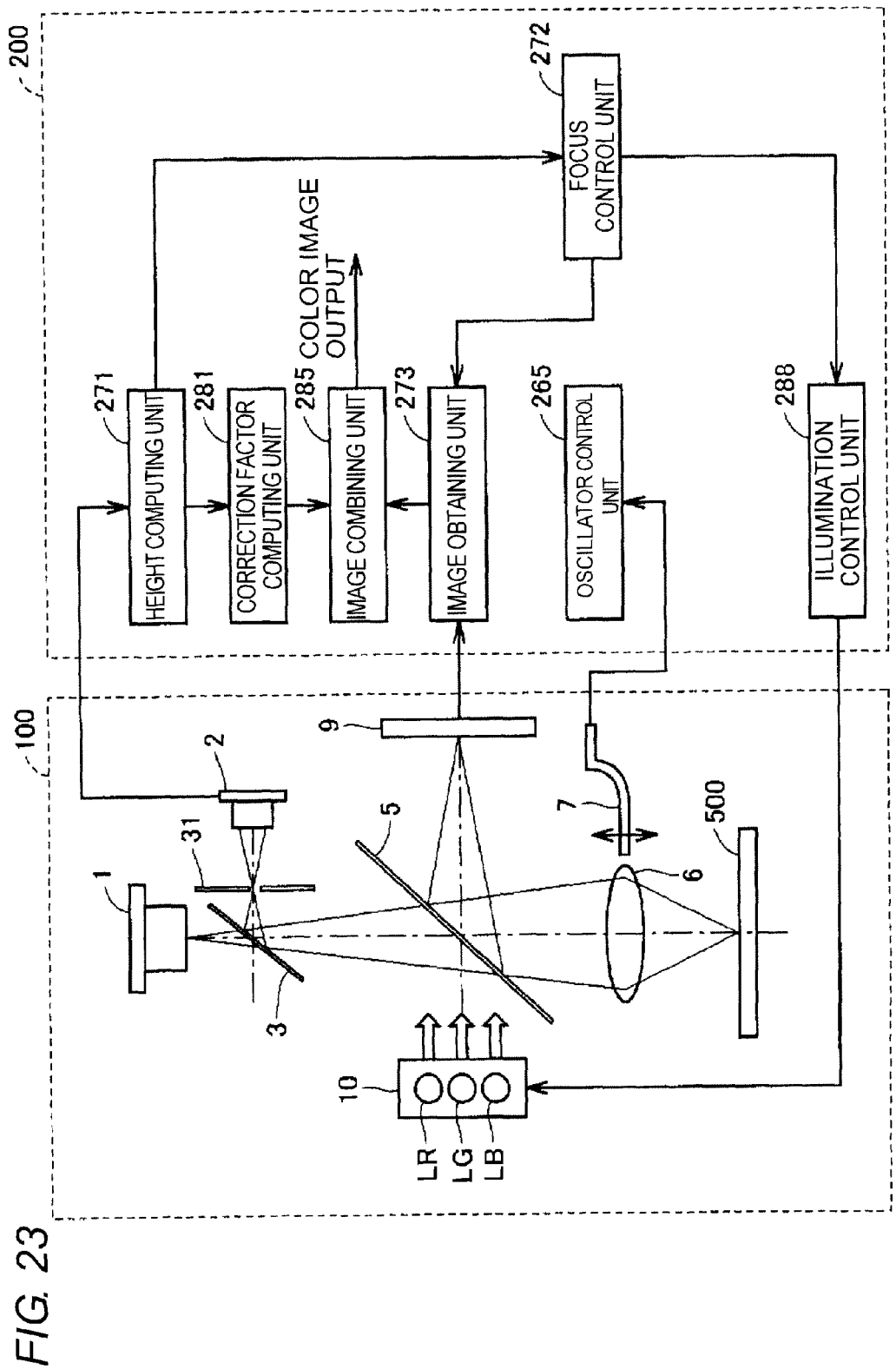
FIG. 23 schematically illustrates an entire configuration of the measurement apparatus of the eighth embodiment of the present invention.

FIG. 23 schematically illustrates an entire configuration of the measurement apparatus of the eighth embodiment.

In the measurement apparatus of the eighth embodiment, an illumination unit 10 of the image obtaining unit can independently emit each of the pieces of light having a plurality of colors such as Red (R), Green (G), and Blue (B).

In the eighth embodiment, the controller 200 includes an illumination control unit 288 that controls light-on/turn-off of the illumination unit 10.

Figure 22A:
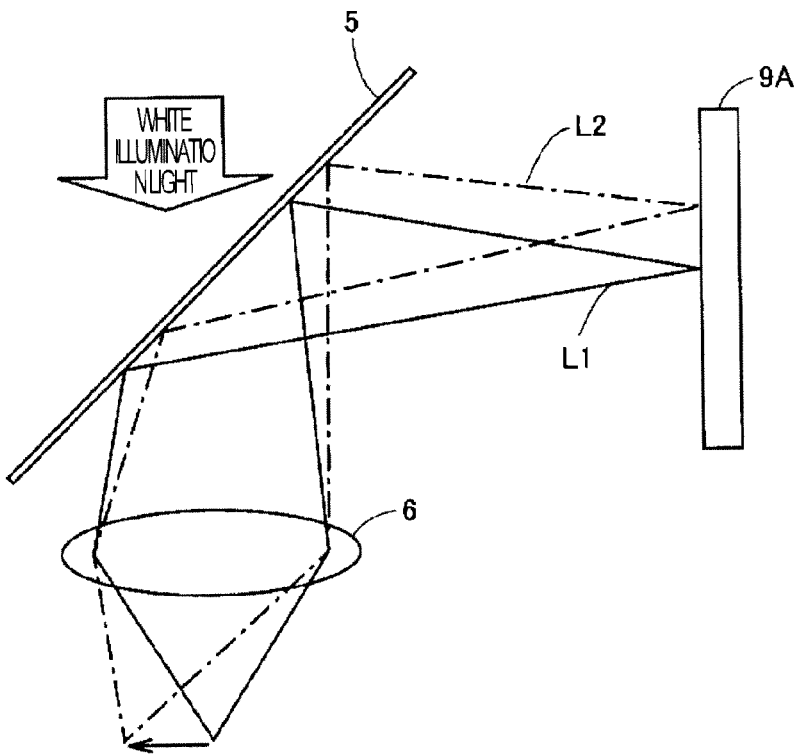
FIGS. 22A and 22B illustrate chromatic aberration in an image obtaining unit of a measurement apparatus according to an eighth embodiment of the present invention.

FIG. 22A illustrates a state in which the light reflected from each position of the measurement object surface forms the image in each position on an imaging device 9A when the measurement object is illuminated with white illumination light. In FIG. 22A, a solid line L1 indicates the light reflected from the position on the optical axis of the objective lens 6, and an alternate long and short dash line L2 indicates the light reflected from the position on the left of the optical axis of the objective lens 6.

Figure 22B:
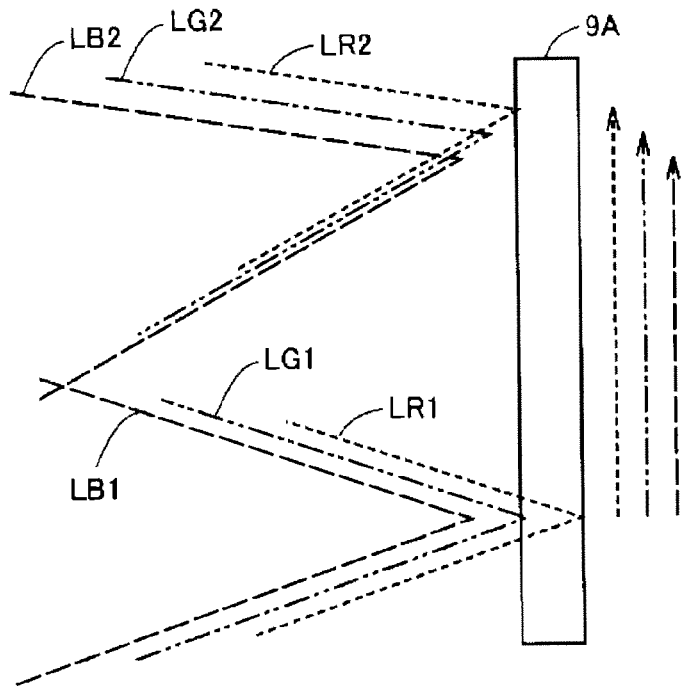

The white illumination light that is of the illumination of the image obtaining unit includes pieces of light having colors such as Red (R), Green (G), and Blue (B). However, as illustrated in FIG. 22B, the position in which the light reflected from each position of the measurement object forms the image on the imaging device 9A depends on the wavelength of the light due to chromatic aberration. In FIG. 22B, a red light optical path is indicated by dotted lines LR1 and LR2, a green light optical path is indicated by alternate long and short dash lines LG1 and LG2, and a blue light optical path is indicated by broken lines LB1 and LB2. FIG. 22B is an enlarged view illustrating a neighborhood of an image formation point of the imaging device 9A of FIG. 22A.

It is assumed that the pieces of light of the line LR1, line LG1, and line LB1 of FIG. 22B are included in the light of the line L1 of FIG. 22A. It is assumed that the pieces of light of the line LR2, line LG2, and line LB2 of FIG. 22B are included in the light of the line L2 of FIG. 22A.

As illustrated in FIG. 22B, in the measurement apparatus, when the image obtaining unit obtains the image in order to obtain a color image while the white light is used as the light source, each color becomes out of focus due to the chromatic aberration, and possibly the image formation is generated with different image formation magnifications.

In the eighth embodiment, in order to avoid the trouble, the illumination unit 10 emits the light in each of colors Red (R), Green (G), and Blue (B) to perform the imaging in each color, and the obtained images are combined to produce the color image.

FIG. 24 schematically illustrates a concept of color image production of the eighth embodiment. In the eighth embodiment, as illustrated in FIG. 24A, the focus control unit 272 extracts the focus adjustment value (image obtaining timing in the configuration of FIG. 24) such that the red light comes into focus on the imaging device 9A by the measurement result of the displacement measuring unit. The illumination unit 10 emits the red light, and the imaging device 9A takes the focused image.

As illustrated in FIG. 24B, the focus control unit 272 extracts the focus adjustment value such that the green light comes into focus on the imaging device 9A by the measurement result of the displacement measuring unit. The illumination unit 10 emits the green light, and the imaging device 9A takes the focused image.

As illustrated in FIG. 24C, the focus control unit 272 extracts the focus adjustment value such that the blue light comes into focus on the imaging device 9A by the measurement result of the displacement measuring unit. The illumination unit 10 emits the blue light, and the imaging device 9A takes the focused image.

After the image sizes are corrected such that the obtained red image, green image and blue image become identical to one another in the image formation magnification, the three images are combined to obtain the color image.

Therefore, the color image is obtained while each color comes into focus. The focused position relationship among the colors in the image obtaining unit of the measurement apparatus will be described with reference to FIG. 25.

Figure 25:
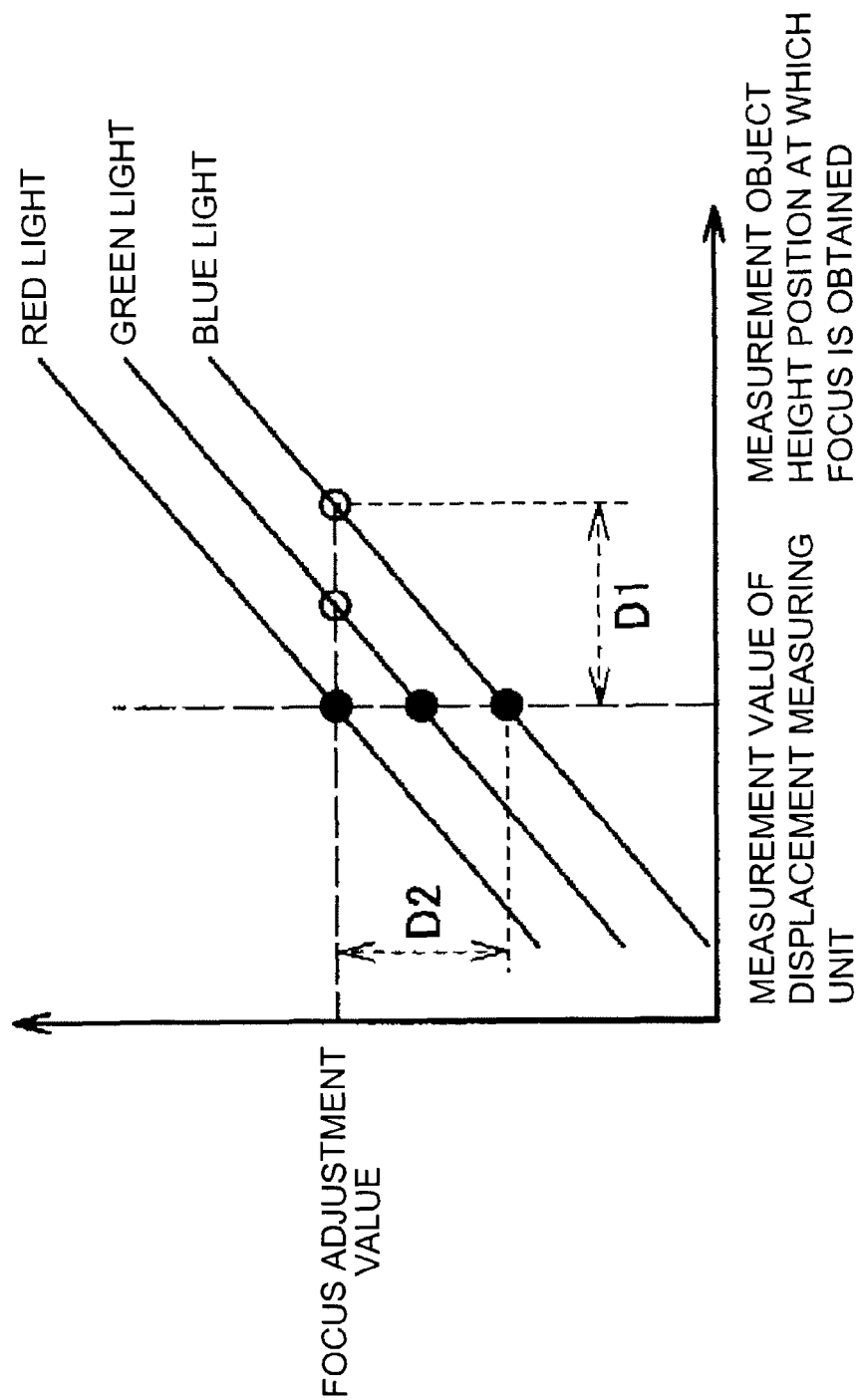
FIG. 25 illustrates a relationship among focused positions (in-focus position) of colors with respect to the image obtaining unit of the measurement apparatus.

In FIG. 25, a vertical axis indicates a focus adjustment value, and a horizontal axis indicates a height position (obtained by measurement result of the displacement measuring unit) of the measurement object that comes into focus.

As illustrated in FIG. 25, when the focus adjustment values are identical to one another, as the wavelength of the light is shortened in the order of red, green, and blue, the height that comes into focus is increased (the focus is obtained in the position in which measurement object is located closer to sensor head 100). When the height at which the measurement object 500 is placed during the focus adjustment, the focus adjustment value varies according to the change in wavelength of the red light, green light, and blue light.

Therefore, in the measurement apparatus of the eighth embodiment, as described above with reference FIG. 12, the focus adjustment value is obtained for each color while the height position of the measurement object is previously changed, and the focus adjustment values are stored as a database in the information storage unit 220.

FIG. 28 illustrates an example of contents of the database. In FIG. 28, the focus adjustment value and the correction factor for the illumination light of each of the red, green, and blue colors are stored in each measurement object height T.

The specific processing for producing the obtained image using the database will be described with reference to a flowchart of FIGS. 26 and 27.

Figure 26:
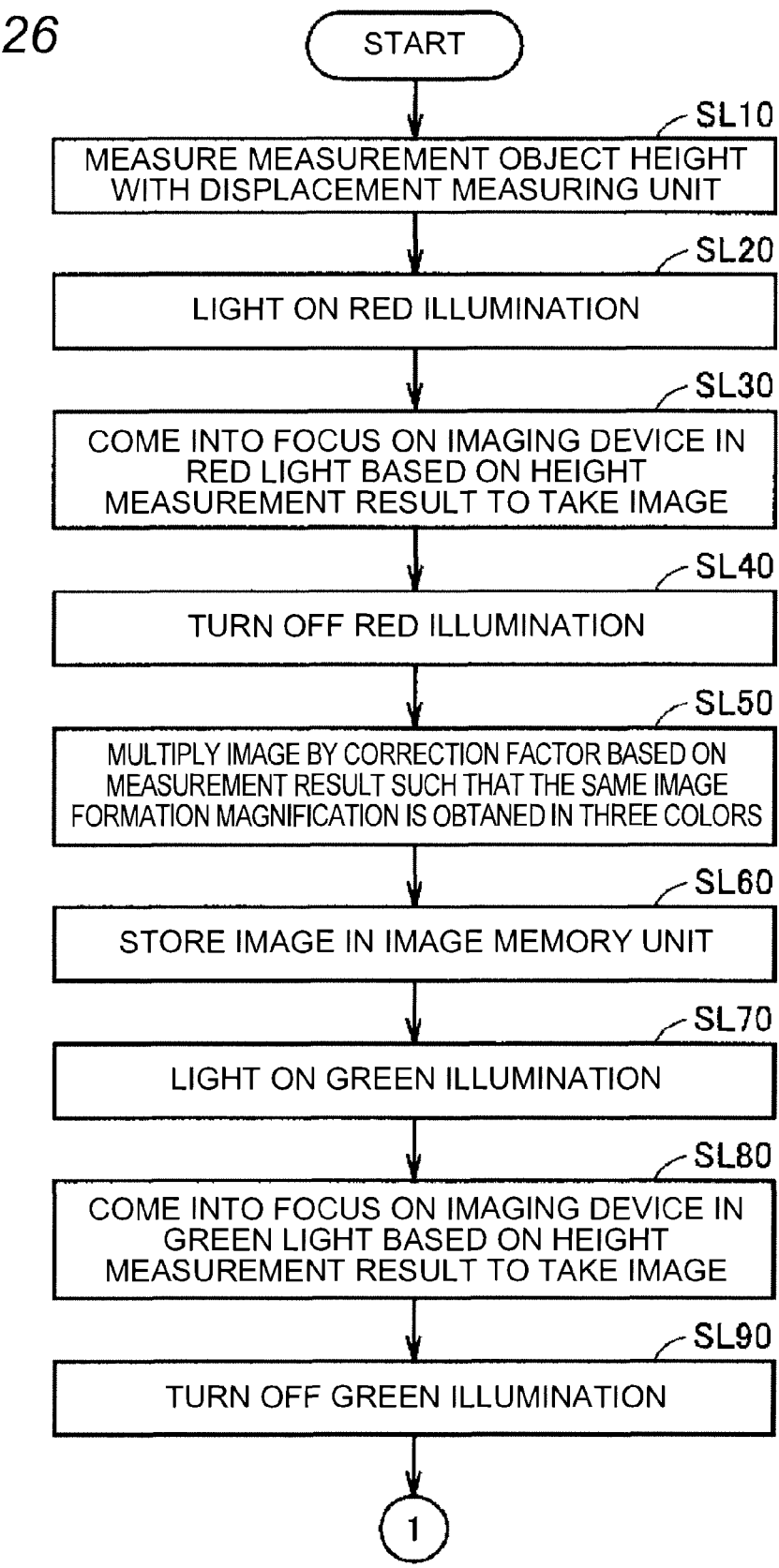
FIG. 26 illustrates a flowchart of obtained image producing processing performed in the measurement apparatus of the eighth embodiment.
Figure 27:
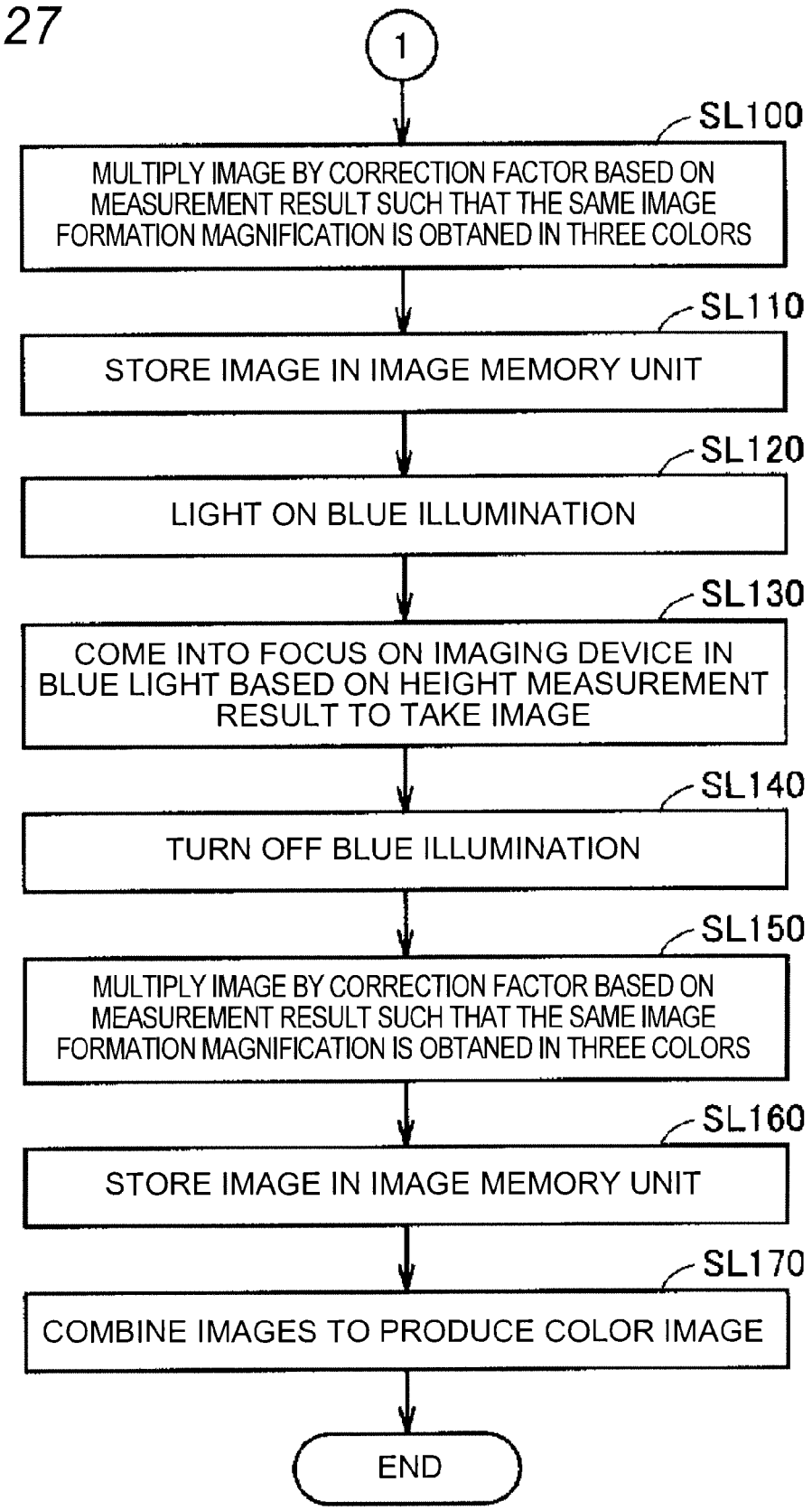
FIG. 27 illustrates a flowchart of obtained image producing processing performed in the image combining processing of the eighth embodiment.

Referring to FIG. 26, in Step SL10, the displacement measuring unit of the measurement apparatus measures the measurement object height.

In Step SL20, the red illumination of the illumination unit 10 is lit on.

In Step SL30, the focus adjustment value for the red color corresponding to the height measurement result obtained in Step SL10 is obtained from the database of FIG. 28, the image obtaining timing is determined based on the focus adjustment value to perform the focus adjustment, and the image is obtained.

In Step SL40, the red illumination lit on in Step SL20 is turned off.

In Step SL50, the image formation magnification of the image obtained in Step SL30 is corrected using the red correction factor corresponding to the height measurement result obtained in Step SL10. The image formation magnification can be corrected in the way similar to that of FIG. 20.

In Step SL60, the post-correction image data (red image data) in Step SL50 is stored in the image memory unit (information storage unit 220).

In Step SL70, the green illumination of the illumination unit 10 is lit on.

In Step SL80, the focus adjustment value for the green color corresponding to the height measurement result obtained in Step SL10 is obtained from the database of FIG. 28, the image obtaining timing is determined based on the focus adjustment value to perform the focus adjustment, and the image is obtained.

In Step SL90, the green illumination lit on in Step SL70 is turned off.

In Step SL100, the image formation magnification of the image obtained in Step SL80 is corrected using the green correction factor corresponding to the height measurement result obtained in Step SL10. The image formation magnification can be corrected in the way similar to that of FIG. 20.

In Step SL110, the post-correction image data (green image data) in Step SL100 is stored in the image memory unit (information storage unit 220).

In Step SL120, the blue illumination of the illumination unit 10 is lit on.

In Step SL130, the focus adjustment value for the blue color corresponding to the height measurement result obtained in Step SL10 is obtained from the database of FIG. 28, the image obtaining timing is determined based on the focus adjustment value to perform the focus adjustment, and the image is obtained.

In Step SL140, the blue illumination lit on in Step SL120 is turned off.

In Step SL150, the image formation magnification of the image obtained in Step SL130 is corrected using the blue correction factor corresponding to the height measurement result obtained in Step SL10. The image formation magnification can be corrected in the way similar to that of FIG. 20.

In Step SL160, the post-correction image data (blue image data) in Step SL150 is stored in the image memory unit (information storage unit 220).

In Step SL170, the red, green, and blue pieces of image data stored in Steps SL60, SL110, and S160 are combined to obtain the color image. Then the processing is ended.

The disclosed embodiments are described only by way of example, and it is noted that the present invention is not limited to the embodiments. The scope of the present invention is expressed by not the description but claims of the present invention, and the scope of the present invention includes meanings equivalent to claims and all modifications within a range of claims. The technical thoughts described in the embodiments can be realized while combined as much as possible.

What is claimed is:

1. A measurement apparatus comprising one or more controllers configured to form the following components:
    a displacement measuring unit configured to measure displacement of a surface of a measurement object;
    an image obtaining unit configured to obtain a two-dimensional image of the measurement object with an imaging device; and
    an image measuring unit configured to compute a length between two points on the measurement object from the obtained image by computing a correction factor based on the displacement measured by the displacement measuring unit, the correction factor being for converting a length between the two points in the obtained image into the actual length between the two points;
    a storage unit configured to store the correction factor and the displacement measured by the displacement measuring unit.

2. The measurement apparatus according to claim 1, wherein the storage unit is being configured to store related information indicating a relationship between a well-known distance between each two of a plurality of feature points on a specific measurement object with a measurement distance between each two of the plurality of feature points on the image obtained by the image obtaining unit and the measurement result of the displacement measuring unit in obtaining the image of the specific measurement object,
    wherein the image measuring unit is configured to compute a length between two points on an unknown measurement object from the obtained image of the unknown measurement object based on a measurement result of the unknown measurement object by the displacement measuring unit and the related information stored in the storage unit.

3. The measurement apparatus according to claim 2, wherein the storage unit is configured to store, as the related information with respect to the specific measurement object, a relationship between a well-known distance between each two of the plurality of feature points on the measurement object and a measurement distance between each two of the plurality of feature points on the image obtained by the image obtaining unit in a plurality of distances with the displacement measuring unit and a relationship with measurement result of the displacement measuring unit in obtaining the image of the specific measurement object.

4. The measurement apparatus according to claim 2, wherein the storage unit is configured to store, as the related information with respect to the specific measurement object, a function expressing relevance of a relationship between a well-known distance between each two of the plurality of feature points on the measurement object and a measurement distance between each two of the plurality of feature points on the image obtained by the image obtaining unit in a plurality of distances with the displacement measuring unit and a measurement result of the displacement measuring unit in obtaining the image of the specific measurement object.

5. The measurement apparatus according to claim 2, wherein the image measuring unit is configured to compute a length between two points on an unknown measurement object based on the related information when receiving input of positions of the two points in the image obtained by the image obtaining unit with respect to the unknown measurement object.

6. The measurement apparatus according to claim 2, wherein, in each image of the measurement object, which is obtained by controlling an optical arrangement such that the image obtaining unit becomes focused states for a plurality of positions in an optical axis direction of light in which the imaging device takes the image,
    the image measuring unit is configured to extract focused pixels of each image of the measurement object to produce a partial image including the extracted focused pixels, is configured to convert the produced partial image with a magnification corresponding to the control of the optical arrangement in which the image obtaining unit becomes the focused state, and is configured to combine the converted image of each image of the measurement object with the magnification to produce a corrected image.

7. The measurement apparatus according to claim 1, wherein the image obtaining unit includes an illumination unit configured to independently emit pieces of light having a plurality of colors, the optical arrangement is controlled to obtain the image in each color of the light emitted from the illumination unit such that the image obtaining unit becomes the focused state, and based on the control of the optical arrangement performed to the image obtained in each color of the light emitted from the illumination unit, the magnification of the image obtained in each color of the light emitted from the illumination unit is converted, and an image is produced by combining the converted images.

8. The measurement apparatus according to claim 1, wherein an optical arrangement is controlled such that the image obtaining unit becomes a focused state based on measurement result of the displacement measuring unit.

9. The measurement apparatus according to claim 1, wherein timing the image obtaining unit obtains an input image inputted to the image measuring unit is controlled based on measurement result of the displacement measuring unit.

\* \* \* \* \*